United States Patent
Choi

(10) Patent No.: US 8,990,721 B2
(45) Date of Patent: Mar. 24, 2015

(54) MOBILE TERMINAL AND METHOD OF CONTROLLING THE SAME

(75) Inventor: Haengkeol Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 13/089,190

(22) Filed: Apr. 18, 2011

(65) Prior Publication Data

US 2011/0276911 A1 Nov. 10, 2011

(30) Foreign Application Priority Data

May 6, 2010 (KR) .................. 10-2010-0042565

(51) Int. Cl.
 G06F 3/00 (2006.01)
 G06F 3/048 (2013.01)
 G06F 9/44 (2006.01)

(52) U.S. Cl.
 CPC .................... *G06F 9/4445* (2013.01)
 USPC ........................... 715/769; 715/782; 715/753

(58) Field of Classification Search
 USPC .......... 715/769, 723, 753, 758, 782, 736–742
 See application file for complete search history.

(56) References Cited

U.S. PATENT DOCUMENTS

| 5,867,654 A | 2/1999 | Ludwig et al. | |
| 7,620,906 B2 * | 11/2009 | Igeta | 715/769 |
| 2009/0222766 A1 * | 9/2009 | Chae et al. | 715/835 |
| 2010/0071038 A1 * | 3/2010 | Flynn et al. | 726/5 |
| 2010/0169790 A1 * | 7/2010 | Vaughan et al. | 715/740 |
| 2012/0165071 A1 * | 6/2012 | Hsu et al. | 455/557 |

FOREIGN PATENT DOCUMENTS

| CN | 1363184 | 8/2002 |
| CN | 101662667 | 3/2010 |
| EP | 0475581 | 3/1992 |
| WO | 01/18691 | 3/2001 |

OTHER PUBLICATIONS

LanSchool 7.4, Users Guide, Copyright 1996-2009, pp. 1-29.*
The State Intellectual Property Office of the People's Republic of China Application Serial No. 201110119277.2, Office Action dated Feb. 18, 2013, 8 pages.

* cited by examiner

*Primary Examiner* — Weilun Lo
*Assistant Examiner* — Truc Chuong
(74) *Attorney, Agent, or Firm* — Lee, Hong, Degerman, Kang & Waimey

(57) ABSTRACT

A mobile terminal includes a display, a communication unit receiving, from other electronic devices, information related to contents being executed at the other electronic devices, and a controller controlling displaying of widgets individually corresponding to a respective one of the electronic devices on the display. Each of the widgets displayed on the display of the mobile terminal represents information relating to contents that is being executed at a corresponding one of the other electronic devices.

18 Claims, 24 Drawing Sheets

FIG. 18
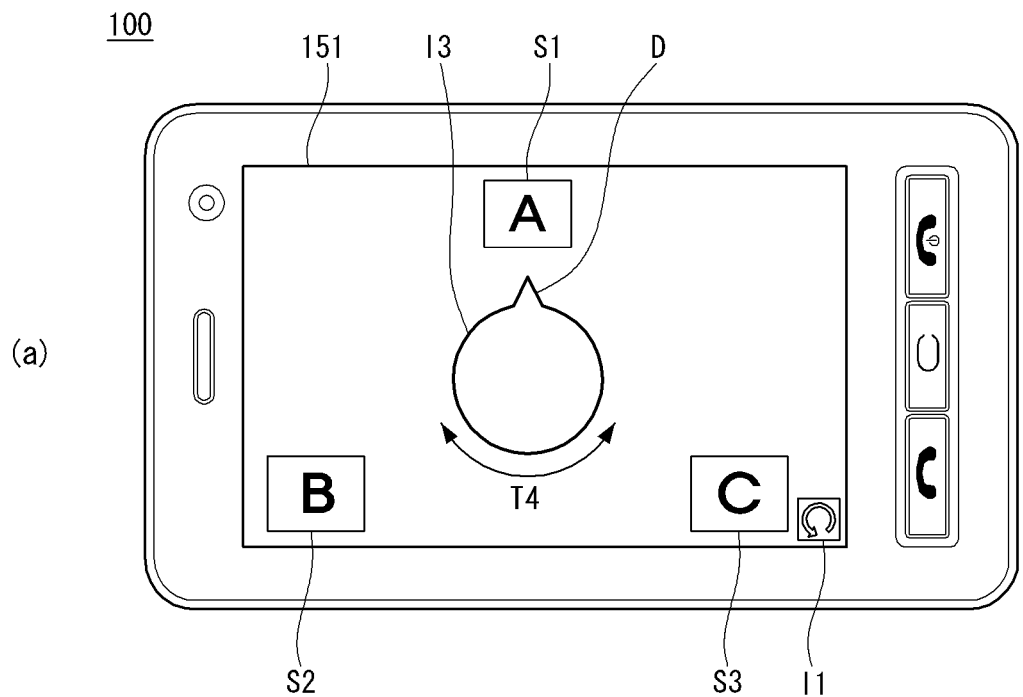
(a)
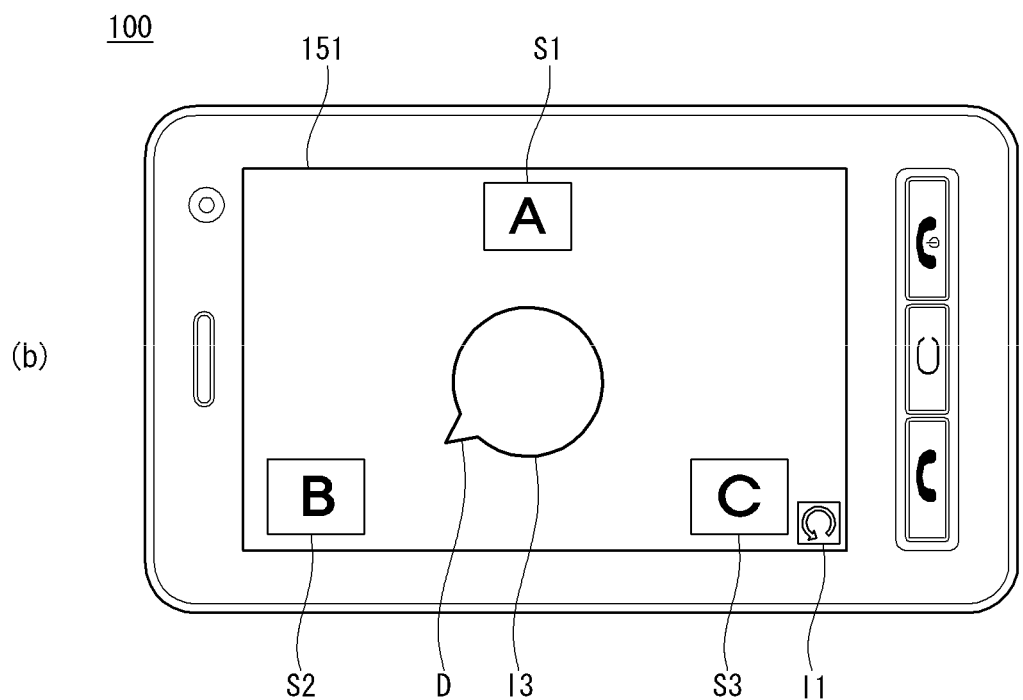
(b)

FIG. 19
(a)
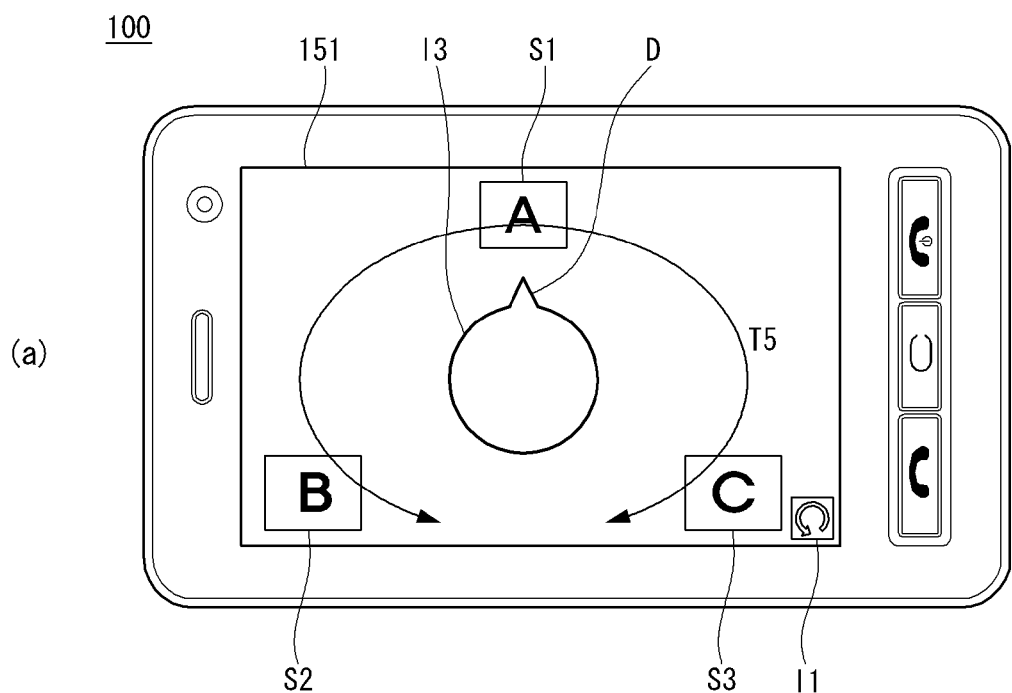
(b)
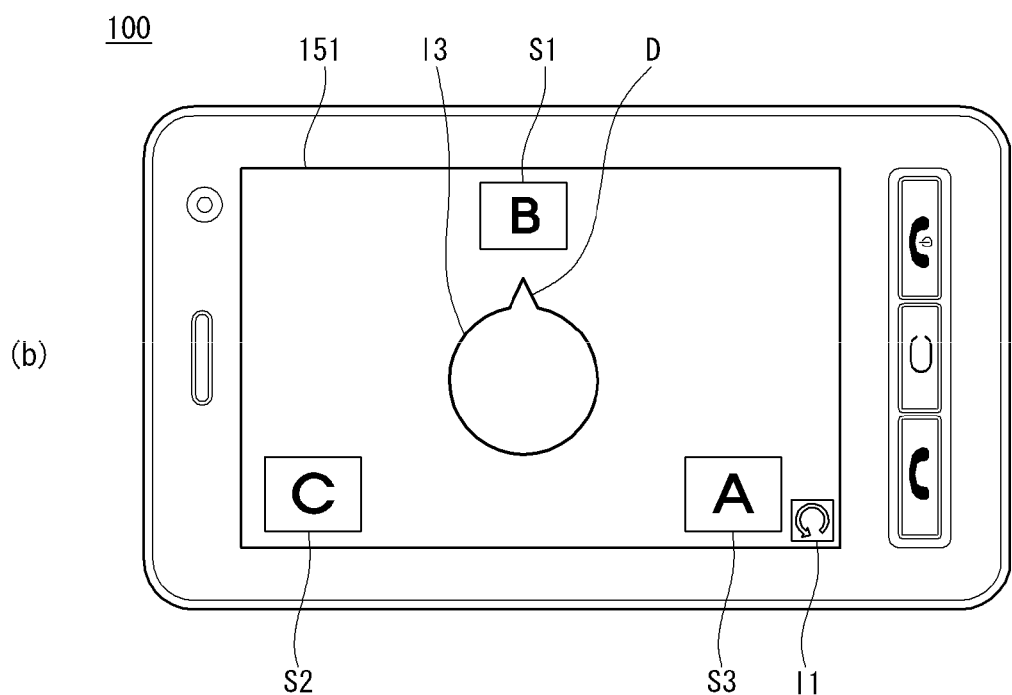

MOBILE TERMINAL AND METHOD OF CONTROLLING THE SAME

CROSS REFERENCE TO RELATED APPLICATIONS

Pursuant to 35 U.S.C. §119(a), this application claims the benefit of earlier filing date and right of priority to Korean Patent Application No. 10-2010-0042565 filed on May 6, 2010, the contents of which are hereby incorporated by reference herein in their entirety.

FIELD OF THE INVENTION

The present invention relates to a mobile terminal and a control method thereof and, more particularly, to a mobile terminal and a control method thereof to display widgets reflecting contents information received from other electronic devices.

DESCRIPTION OF THE RELATED ART

As the functions of terminals, such as personal computers, laptop computers, cellular phones and the like, are diversified, the terminals are constructed in the form of a multimedia player having multiple functions such as capturing pictures or moving images, playing music, moving image files and games, and receiving broadcasting programs.

Terminals can be divided into mobile terminals and stationary terminals. The mobile terminals can be classified into handheld terminals and vehicle mountable terminals according to their modes of mobility.

A variety of recent terminals including mobile terminals provide more complex and various functions. To support and enhance functions of a terminal, a structural part and/or a software part of the terminal need to be improved.

SUMMARY OF THE INVENTION

An aspect of this document is to provide a mobile terminal and a control method thereof to display widgets reflecting contents information received from other electronic devices.

According to an embodiment of the present invention, a mobile terminal includes a display, a communication unit receiving, from other electronic devices, information related to contents being executed at the other electronic devices, and a controller controlling displaying of widgets individually corresponding to a respective one of the electronic devices on the display. Each of the widgets displayed on the display of the mobile terminal represents information relating to contents that is being executed at a corresponding one of the other electronic devices.

According to another embodiment of the present invention, a method of controlling a mobile terminal includes communicating with other electronic devices, receiving contents information from the other electronic devices, the contents information being information related to contents that is being executed at the other electronic devices, and displaying, on a display of the mobile terminal, widgets individually corresponding to a respective one of the other electronic devices, each of the widgets representing contents information of a corresponding one of the other electronic devices.

BRIEF DESCRIPTION OF THE DRAWINGS

The implementation of the present invention will be described in detail with reference to the following drawings in which like numerals refer to like elements.

FIGS. 10(a)-12(b) illustrate operations of displaying contents information acquired by a mobile terminal and manipulating the displayed contents information according to various embodiments of the present invention.

FIGS. 14(a)-19(b) illustrate operations of outputting contents information received from external electronic devices and controlling the external electronic devices based on the contents information according to various embodiments of the present invention.

DETAILED DESCRIPTION OF PREFERRED EMBODIMENTS

The present invention will now be described more fully with reference to the accompanying drawings, in which exemplary embodiments of the present invention are shown. The present invention may, however, be embodied in many different forms and should not be construed as being limited to the embodiments set forth herein; rather, these embodiments are provided so that this disclosure will be thorough and complete, and will fully convey the concept of the present invention to those skilled in the art.

In the following description, suffixes "module" and "unit" are given to components of the mobile terminal in consideration of only facilitation of description and do not have meanings or functions discriminated from each other. The mobile terminal described in the specification may include a cellular phone, a smart phone, a laptop computer, a digital broadcasting terminal, personal digital assistants (PDA), a portable multimedia player (PMP), a navigation system and so on.

Figure 1:
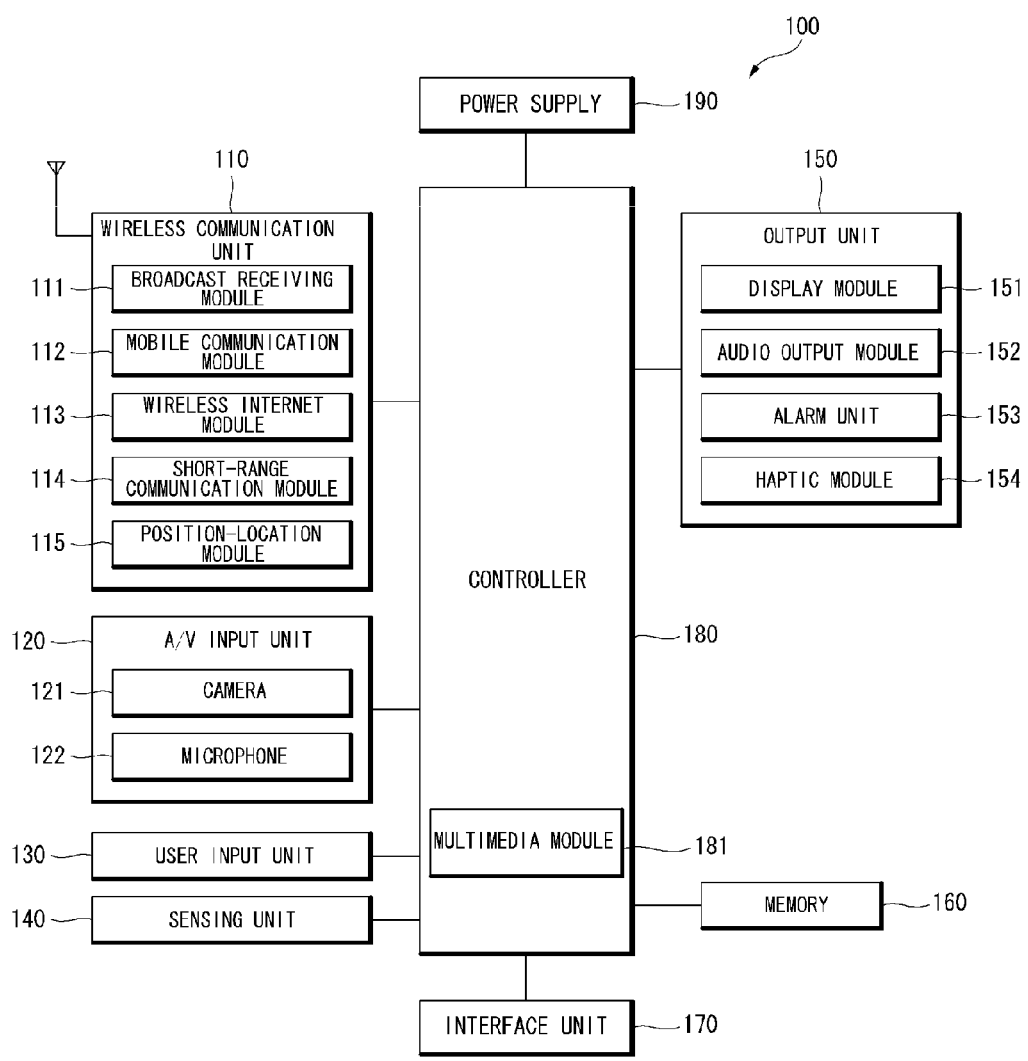
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided for the present invention. As shown if FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 may be essential parts and the number of components included in the mobile terminal 100 may be varied. The components of the mobile terminal 100 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area or short-range communication module 114, and a position-location module 115.

The broadcast receiving module 111 may receive broadcast signals and/or broadcast related information from an external broadcast management server through a broadcast channel. The broadcast channel may include a satellite channel and a terrestrial channel, and the broadcast management server may be a server that generates and transmits broadcast signals and/or broadcast related information or a server that receives previously created broadcast signals and/or broadcast related information and transmits the broadcast signals and/or broadcast related information to a terminal.

The broadcast signals may include not only TV broadcast signals, radio broadcast signals, and data broadcast signals, but also signals in the form of a combination of a TV broadcast signal and a radio broadcast signal. The broadcast related information may be information on a broadcast channel, a broadcast program or a broadcast service provider, and may be provided even through a mobile communication network. In the latter case, the broadcast related information may be received by the mobile communication module 112.

The broadcast related information may exist in various forms. For example, the broadcast related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcast signals using various broadcasting systems. More particularly, the broadcast receiving module 111 may receive digital broadcast signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcast receiving module 111 may receive signals from broadcasting systems providing broadcast signals other than the above-described digital broadcast systems.

The broadcast signals and/or broadcast related information received through the broadcast receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short-range communication module 114 may correspond to a module for local area communication. Further, Bluetooth®, radio frequency identification (RFID), infrared data association (IrDA), ultra wideband (UWB) and/or Zig-Bee® may be used as a local area communication technique.

The position-location module 115 may confirm or obtain the position of the mobile terminal 100. The position-location module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the position-location module 115. The GPS module may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141 (not shown in the drawings).

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

In addition, the display module 151 may include at least one of a liquid crystal display, a thin film transistor liquid crystal display, an organic light-emitting diode display, a flexible display and a three-dimensional display. Some of these displays may be of a transparent type or a light transmissive type. That is, the display module 151 may include a transparent display module.

The transparent display module may include a transparent liquid crystal display. The rear structure of the display module 151 may also be of a light transmissive type. Accordingly, a user may see an object located behind the body of the mobile terminal 100 through the transparent area of the body of the mobile terminal 100 that is occupied by the display module 151.

The mobile terminal 100 may also include at least two display modules 151. For example, the mobile terminal 100 may include a plurality of display modules 151 that are arranged on a single face at a predetermined distance or integrated displays. The plurality of display modules 151 may also be arranged on different sides.

Further, when the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a "proximity touch" and an action of bringing the pointer into contact with the touch screen may be referred to as a "contact touch." The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, and the like). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm unit 153 may output a signal for indicating generation of an event of the mobile terminal 100. For example, alarms may be generated when receiving a call signal, receiving a message, inputting a key signal, or inputting touch. The alarm unit 153 may also output signals in forms different from video signals or audio signals, for example, a signal for indicating generation of an event through vibration. The video signals or the audio signals may also be output through the display unit 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface unit 170 may serve as a path to external devices connected to the mobile terminal 100. The interface unit 170 may receive data from the external devices or power and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
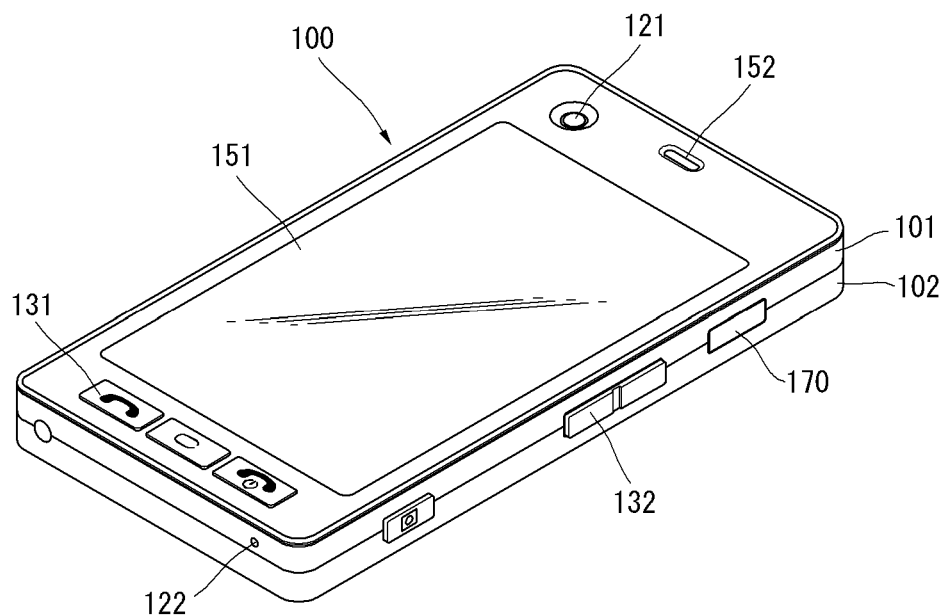
FIG. 2A is a front perspective view of a mobile terminal according to an embodiment of present invention.

FIG. 2A is a front perspective view of a mobile terminal or a handheld terminal 100 according to an embodiment of the present invention. For example, the handheld terminal 100 has a bar type terminal body. However, the present invention is not limited to a bar type terminal and can be applied to terminals of various types including a slide type, a folder type, a swing type and a swivel type terminal having at least two bodies that are relatively movably combined.

The terminal body includes a case (a casing, a housing, or a cover) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display module 151, the audio output module 152, the camera 121, the user input unit 130 including operating units 131 and 132, the microphone 122 and the interface unit 170 can be arranged in the terminal body, specifically, in the front case 101.

The display module 151 occupies most part of the main face of the front case 101. The audio output module 152 and the camera 121 are arranged in a region in proximity to one of both ends of the display module 151 and the operating unit 131 and the microphone 122 are located in a region in proximity to the other end of the display unit 151. The operating unit 132 and the interface unit 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output module 152 or conversion of the display module 151 to a touch recognition mode.

Figure 2B:
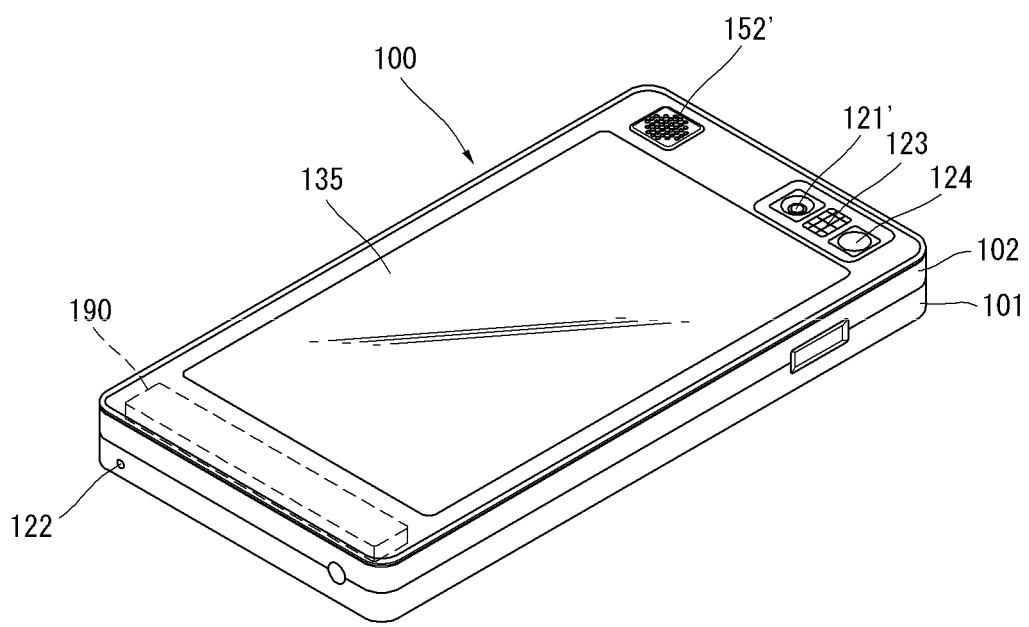
FIG. 2B is a rear perspective view of a mobile terminal according to an embodiment of the present invention.

FIG. 2B is a rear perspective view of the handheld terminal shown in FIG. 2A according to an embodiment of the present invention.

Referring to FIG. 2B, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output module 152' can be additionally provided on the rear side of the terminal body. The audio output module 152' can achieve a stereo function with the audio output module 152 shown in FIG. 2A and be used for a speaker phone mode when the mobile terminal 100 is used for a telephone call.

A broadcast signal receiving antenna can be additionally attached to the side of the terminal body in addition to an antenna for telephone calls. The antenna constructing a part of the broadcast receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display module 151. In this case, if the display module 151 outputs visual information through both sides thereof, the visual information can be recognized through the touch pad 135. The information output through both sides of the display module 151 can be controlled by the touch pad 135. Otherwise, a display is additionally attached to the touch pad 135 such that a touch screen can also be arranged in the rear case 102.

The touch pad 135 operates in connection with the display module 151 of the front case 101. The touch pad 135 can be located in parallel with the display module 151 behind the display module 151. The touch panel 135 can be identical to or smaller than the display module 151 in size.

Figure 2C:
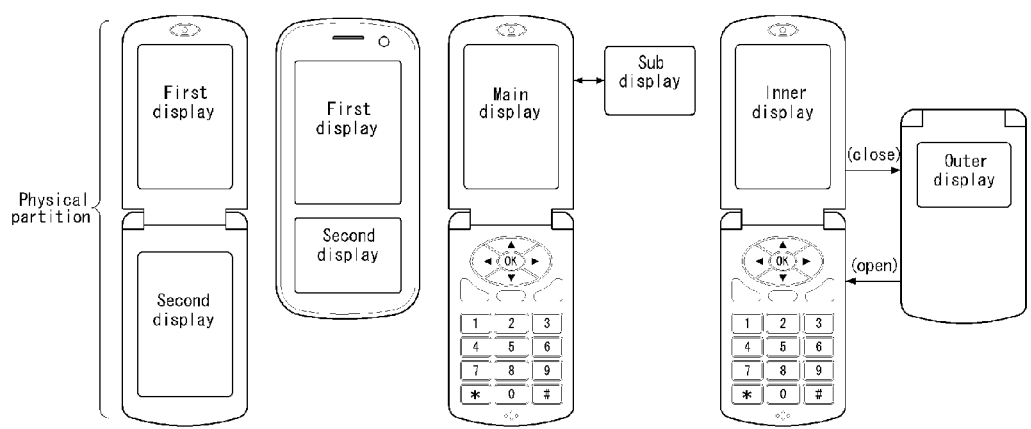
FIGS. 2C and 2D illustrate various forms of mobile terminals and display screens according to various embodiments of the present invention.
Figure 2D:
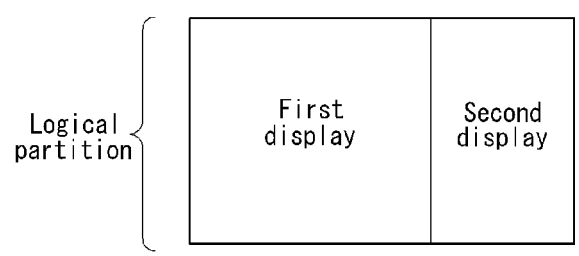

FIGS. 2C and 2D illustrate the mobile terminal 100 and the display unit 151 according to various embodiments of the present invention.

Referring to FIG. 2C, the display module 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display module 151 can include first and second displays which are logically separated from each other in a display panel, as illustrated in FIG. 2D.

Figure 3:
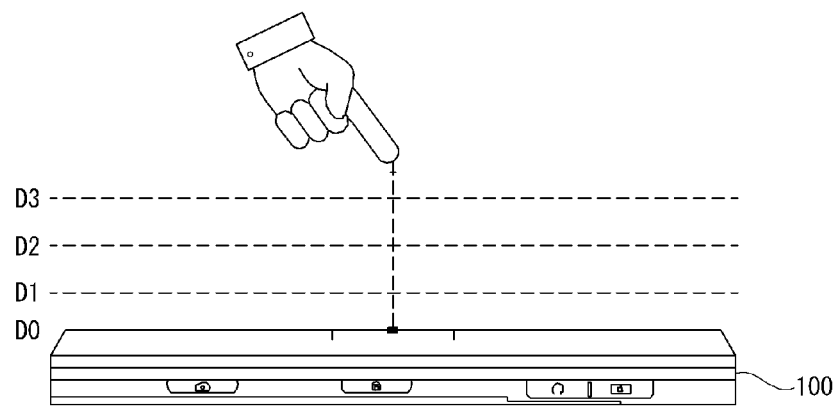
FIG. 3 is a conceptual diagram illustrating a proximity depth of a proximity sensor according to an embodiment of the present invention.

FIG. 3 is a conceptual diagram for explaining a proximity depth of the proximity sensor 141. As shown in FIG. 3, when a pointer such as a user's finger approaches the touch screen, the proximity sensor 141 located inside or near the touch screen senses the approach and outputs a proximity signal. The proximity sensor 141 can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors 141 having different detection distances and comparing proximity signals respectively output from the proximity sensors 141.

FIG. 3 shows the section of the touch screen in which proximity sensors 141 capable of sensing three different proximity depths are arranged. Proximity sensors 141 capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
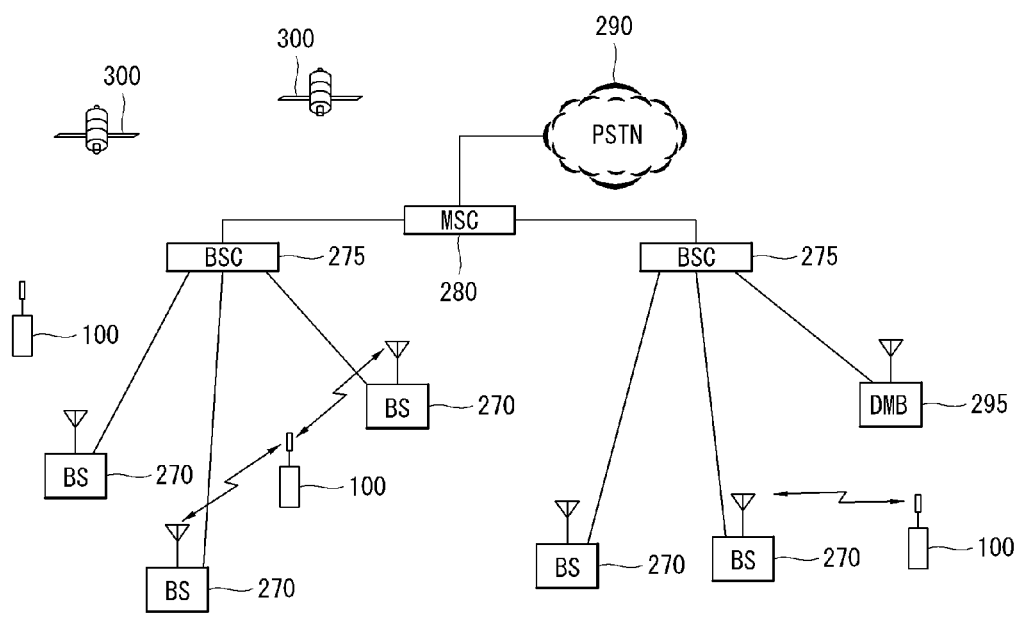
FIG. 4 illustrates a configuration of a code division multiple access (CDMA) wireless communication system communicating with a mobile terminal according to an embodiment of the present invention.

Referring to FIG. 4, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz). Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcast signals to the mobile terminals 100 operating in the CDMA wireless communication system. The broadcast receiving module 111 of each mobile terminal 100 is constructed to receive the broadcast signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the mobile terminals 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 5:
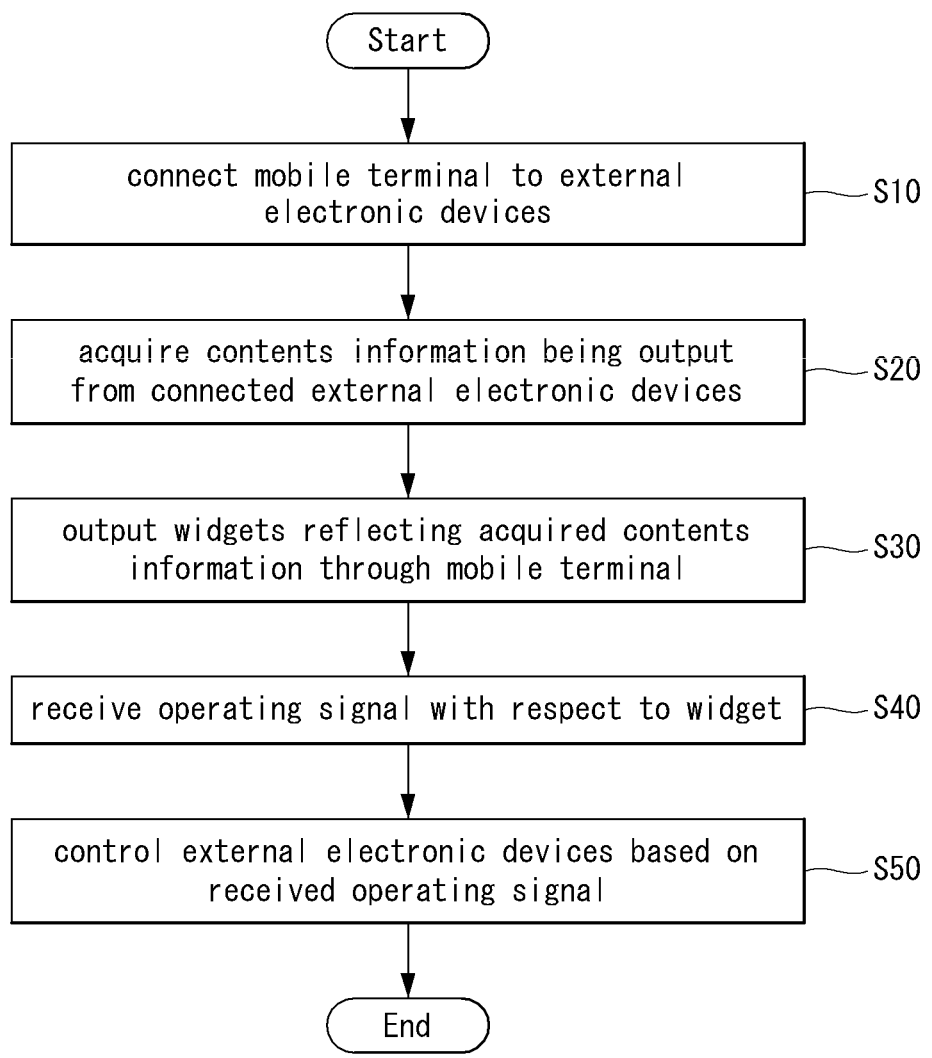
FIG. 5 is a flowchart illustrating an operation of a mobile terminal according to an embodiment of the present invention.
Figure 6:
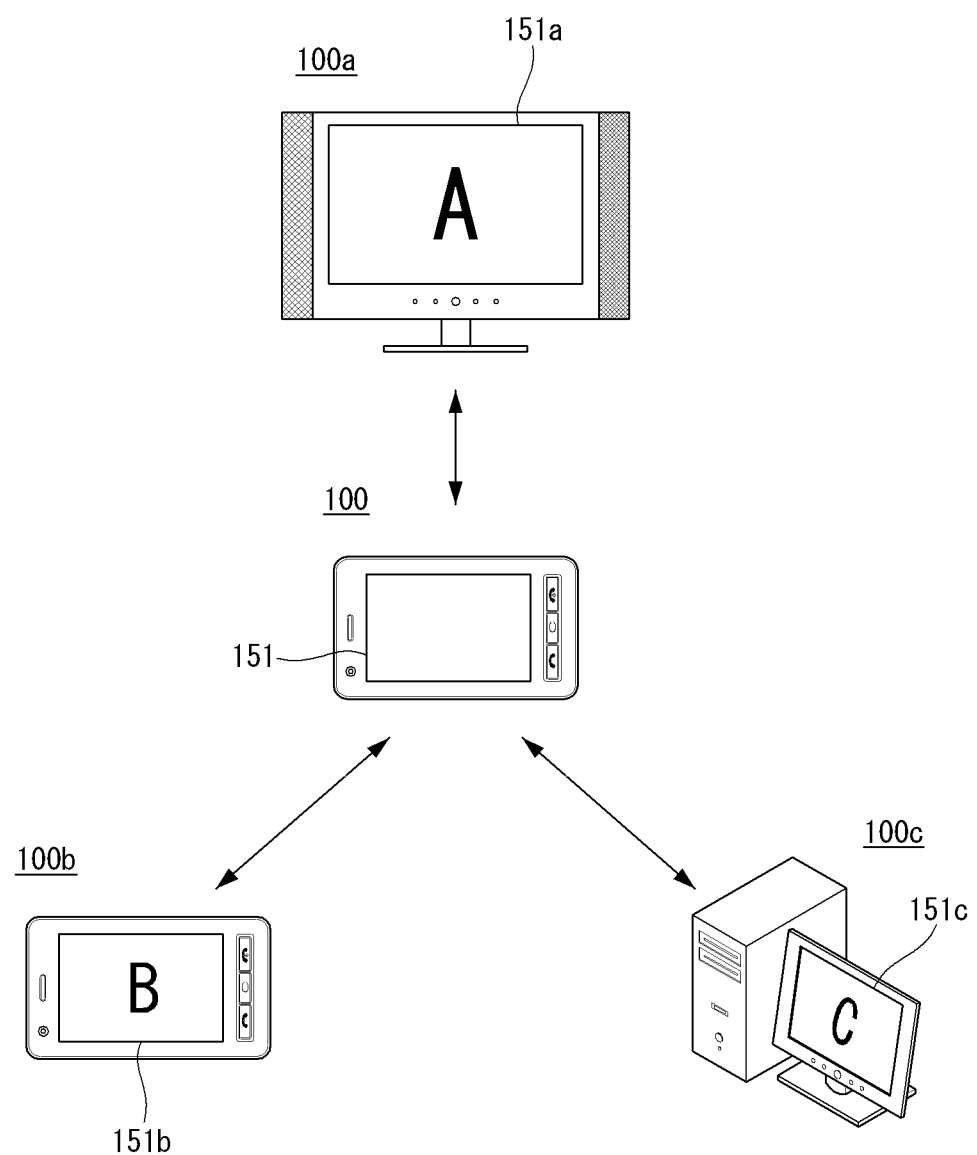
FIGS. 6 and 7 illustrate communication between a mobile terminal and various external electronic devices according to an embodiment of the present invention.
Figure 7:
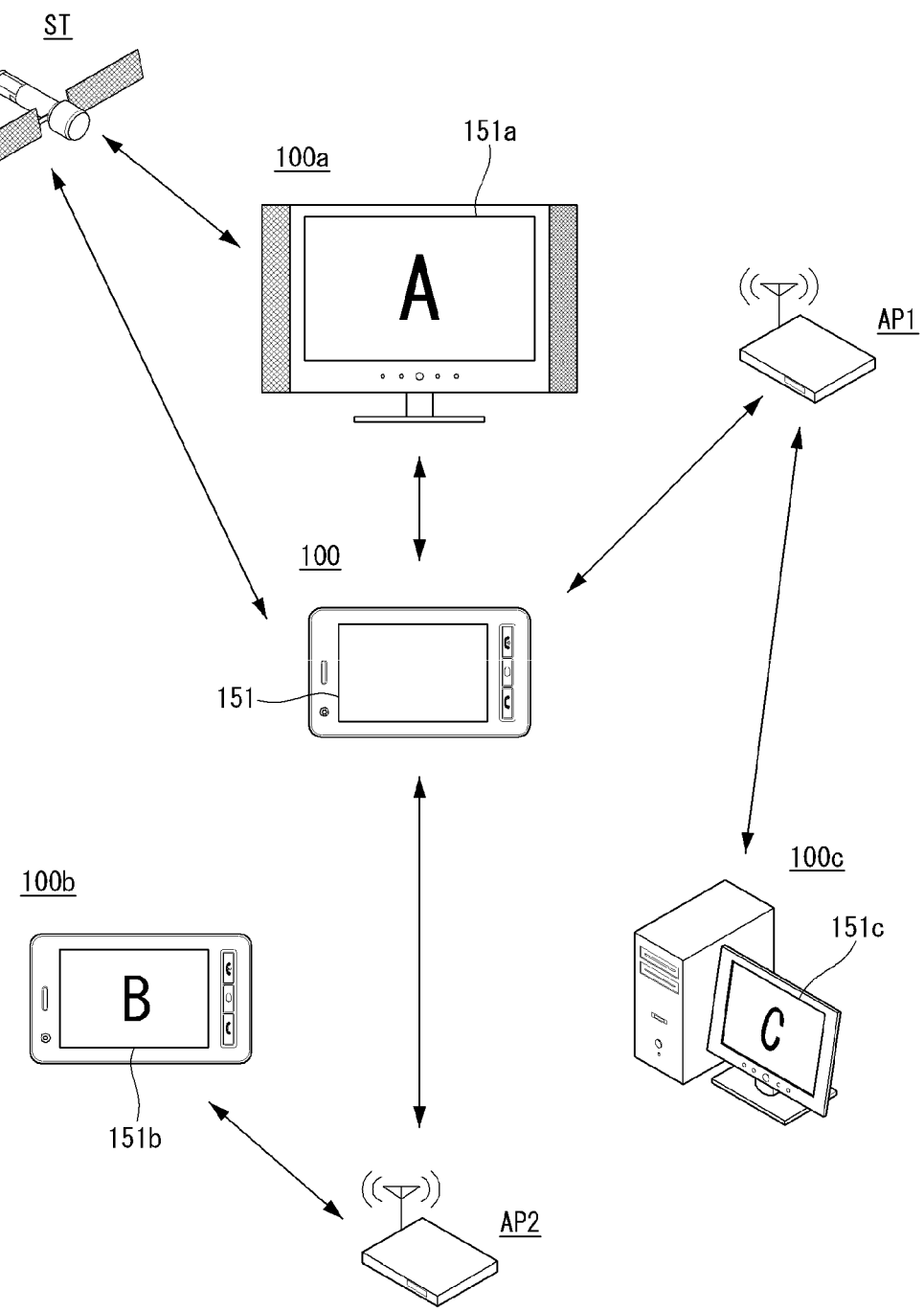

FIG. 5 is a flowchart illustrating a method of controlling the mobile terminal 100 according to an embodiment of the present invention. FIGS. 6 and 7 illustrate connecting the mobile terminal 100 with external electronic devices 100a, 100b and 100c.

Referring to FIGS. 1, 5, 6 and 7, the mobile terminal 100 outputs contents information acquired from the external devices 100a, 100b and 100c and controls the external electronic devices 100a, 100b and 100c based on the contents information. During this operation, the mobile terminal 100 may provide a user interface capable of effectively outputting and controlling the contents information.

The controller 180 of the mobile terminal 100 may connect the mobile terminal 100 to the external electronic devices 100a, 100b and 100c (S10). For example, the external electronic devices are consumer electronic devices such as a TV 100a, a mobile terminal or tablet computing device 100b, and a computer 100c.

The external electronic devices 100a, 100b and 100c may include various electronic devices except for specific electronic devices. For example, if the user currently operates the mobile terminal 100, electronic devices other than the mobile terminal 100 may be referred to as external electronic devices. If the user currently operates the first external electronic device 100a, the mobile terminal 100 and the second and third external electronic devices 100b and 100c may be referred to as external electronic devices. That is, the term "external" electronic device is a relative term. However, electronic devices other than the mobile terminal 100 are generally referred to as the external electronic devices 100a, 100b and 100c hereinafter for the convenience of understanding. Furthermore, although the number of the external electronic devices 100a, 100b and 100c is three in several drawings and the following description, the number of the external electronic devices is not limited to three and may be less than or greater than three.

The external electronic devices 100a, 100b and 100c may wire-communicate or wireless-communicate with other electronic devices. The wireless communication method of the external electronic devices 100a, 100b and 100c may involve communication with the wireless communication unit 110 of the mobile terminal 100 so that detailed explanation thereof is omitted. Connections between the mobile terminal 100 and the external electronic devices 100a, 100b and 100c will be explained in detail later with reference to FIGS. 6 and 7.

Upon connections of the mobile terminal 100 with the external electronic devices 100a, 100b and 100c, the controller 180 may acquire information about contents being output from the external electronic devices 100a, 100b and 100c (S20). The external electronic devices 100a, 100b and 100c may respectively output contents through displays 151a, 151b and 151c included therein.

The information about contents may correspond to the contents themselves or may include description of the contents and information about the source of the contents. When the first external electronic device 100a outputs contents 'A', for example, the mobile terminal 100 can acquire the contents 'A' from the first external electronic device 100a. Furthermore, the mobile terminal 100 can acquire detailed information including the title and running time of the contents 'A'. Moreover, the mobile terminal 100 may acquire the address of the source of the contents 'A', such as a universal resource locator (URL). If the mobile terminal 100 acquires the address of the contents source, the mobile terminal 100 can obtain the contents 'A' without directly receiving the contents 'A' through communication with the first external electronic device 100a. Accordingly, the controller 180 of the mobile terminal 100 can select one of a route of the acquisition of the contents from the address of the contents source and a route of the acquisition of the contents from the first external electronic device 100a, which is more advantageous in terms of data transmission rate.

When the mobile terminal 100 acquires the contents information being output from the external electronic devices 100a, 100b and 100c connected thereto, the controller 180 may output widgets reflecting the acquired contents information from the mobile terminal 100 (S30).

The contents information may include information related to rendering of contents. In such cases, it may be more easily understood if the contents are assumed to be a moving picture (also referred to herein as video). For example, when the mobile terminal 100 transmits contents to at least one of the external electronic devices 100a, 100b, and 100c, information regarding reproduction time point of the contents that is being reproduced at the mobile terminal 100 can be transmitted along with the contents.

If the information regarding reproduction time point and the contents are transmitted together, the external electronic device 100a, 100b, and/or 100c which has received the contents can reproduce the contents continuously without repeating the parts that were already reproduced in the mobile terminal 100 or re-searching of the contents by a user. In other words, the information regarding reproduction time point allows seamless reproduction of the contents such that a user can watch the contents via the external electronic device 100a, 100b, and/or 100c without additionally controlling the same.

The contents information can be transmitted from the mobile terminal 100 to the external electronic devices 100a, 100b, and/or 100c in response to a touch and drag input comprising touching a widget and then dragging the same to a desired external electronic device on a display screen of the display module 151. For example, when widgets respectively corresponding to the external electronic devices 100a, 100b, and 100c are displayed on the display module 151 of the mobile terminal 100, the touch and drag input may be touching a first widget and then dragging the first widget to a second widget on the display screen. Upon receiving such touch and drag input, the mobile terminal 100 can transmit the contents of a first external electronic device 100a corresponding to the first widget to a second external electronic device 100b corresponding to the second widget, and at the same time, can also transmit contents information including reproduction time point of the contents being transmitted. Thus, the second external electronic device 100b that has received the contents and/or contents information can reproduce the contents continuously from the reproduction point indicated in the contents information.

Further, contents and/or contents information may be transmitted to a plurality of external electronic devices 100a, 100b, and 100c at the same time. For example, if a plurality of widgets are selected by a user via multi-touch, the mobile terminal 100 may transmit the contents and/or contents information to the plurality of external electronic devices 100a, 100b, and 100c at the same time. Transmission of contents and/or contents information in response to selection of widget(s) will be described in more detail later in the corresponding section.

As describe above, the acquired contents information may be output in the form of widgets. The widgets respectively corresponding to the contents information may represent the contents information in the form of icons and reflect the status of each of the external electronic devices 100a, 100b and 100c. For example, images output from the external electronic devices 100a, 100b and 100c can be displayed in synchronization with the widgets or relative locations of the external electronic devices 100a, 100b and 100c may be represented by relative locations of the widgets displayed on the display module 151.

When the mobile terminal 100 can output the acquired contents information in the form of widgets, the user can enjoy contents through various routes. For example, if the first external electronic device 100a corresponds to a TV receiver located in a living room of a house, the user may watch the contents 'A' through the TV receiver 100a in the living room. In this case, when the user needs to go out of the house, the user can transfer the contents 'A' and the information about the contents 'A' being output from the first external electronic device 100a to the mobile terminal 100. Further, the user can play the contents 'A' in the mobile terminal 100 based on the information about the contents 'A' received by the mobile terminal 100. Accordingly, the user can continuously watch the contents 'A' and convenience of use can be improved.

Another example of enjoying contents through various routes is described. The user may watch the contents 'A' corresponding to a soccer game through the first external electronic device 100a which is a TV receiver in a living room of the house. The contents 'A' output through the TV receiver may be a moving picture obtained by photographing a soccer stadium with a camera. Here, the user may operate the mobile terminal 100 to acquire information about the contents 'A' from the first external electronic device 100a. Further, the user may output an image, i.e., the soccer game, photographed by the camera through the mobile terminal 100 based on the acquired information. That is, the user can output the identical contents via both one of the external electronic devices and another electronic device such that at least one of the viewpoint and output time of the contents is different from that of the image. By using this function, the user can enjoy a desired best image.

While the mobile terminal 100 outputs the acquired information about the contents, the controller 180 may receive an operating signal with respect to the widgets (S40) and control the external electronic devices 100a, 100b and 100c based on the received operating signal (S50).

The operating signal may be a control signal generated by the user or a control operation of the controller 180. For example, the operating signal may be a signal generated in response to a touch input applied to the display module 151 of the mobile terminal 100 to change contents to be displayed on the overall screen of the display module 151 or change the images displayed on the external electronic devices 100a, 100b and 100c.

When the operating signal with respect to the widgets is generated, the controller 180 may output a control signal for changing the operations of the external electronic devices 100a, 100b and 100c based on the operating signal. For example, the controller 180 can generate a control signal for outputting the contents 'A', being output from the first external electronic device 100a, through the second external electronic device 100b.

Referring to FIG. 6, the mobile terminal 100 can directly communicate with the external electronic devices 100a, 100b and 100c to acquire contents information. The first, second and third external electronic devices 100a, 100b and 100c may be located around or near the mobile terminal 100. The first, second and third displays 151a, 151b and 151c respectively provided to the first, second and third external electronic devices 100a, 100b and 100c may respectively display contents 'A', 'B' and 'C'.

The mobile terminal 100 may communicate with the first, second and third external electronic devices 100a, 100b and 100c through WiFi Direct which enables direct peer-to-peer (P2P) communication between electronic devices without having an additional access point (AP) for relaying data communication. There is a direct communication method, Ad-hoc, similar to WiFi Direct. While Ad-hoc is used for electronic devices relatively close to each other and has a communication speed limited to 11 Mbps, WiFi Direct can support 802.11n to permit electronic devices located farther apart from each other to directly communicate with each other at a communication speed of approximately 300 Mbps.

Sharing contents information between the mobile terminal 100 and the first, second and third external electronic devices 100a, 100b and 100c via direct/indirect communication to display the contents information may be referred to as 3-screen or n-screen. In this case, the mobile terminal 100 and the first, second and third external electronic devices 100a, 100b and 100c may synchronize their video signals and/or audio signals with each other and output the synchronized signals.

Referring to FIG. 7, the mobile terminal 100 may directly or indirectly communicate with the first, second and third external electronic devices 100a, 100b and 100c. For example, the mobile terminal 100 can communicate with the third external electronic device 100c via a first AP AP1 and communicate with the second external electronic device 100b via a second AP AP2. That is, the mobile terminal 100 can indirectly exchange contents information with the second and third external electronic devices 100b and 100c via external networks.

Moreover, the mobile terminal 100 can directly communicate with the first external electronic device 100a using WiFi Direct. Contents shared by the mobile terminal 100 and the first external electronic device 100a may be received through a satellite ST. That is, contents information can be stored in an external storage that is not in the mobile terminal 100 or the first external electronic device 100a. Even when the contents information is stored in the external storage and transmitted from the external storage to the mobile terminal 100 and the first external electronic device 100a through the satellite ST, the mobile terminal 100 can transmit a control signal to the first external electronic device 100a. The control signal transmitted to the first external electronic device 100a may affect the contents 'A' output from the first external electronic device 100a. For example, the control signal can stop outputting the contents 'A' or change the time and/or viewpoint of the contents 'A'.

Figure 8:
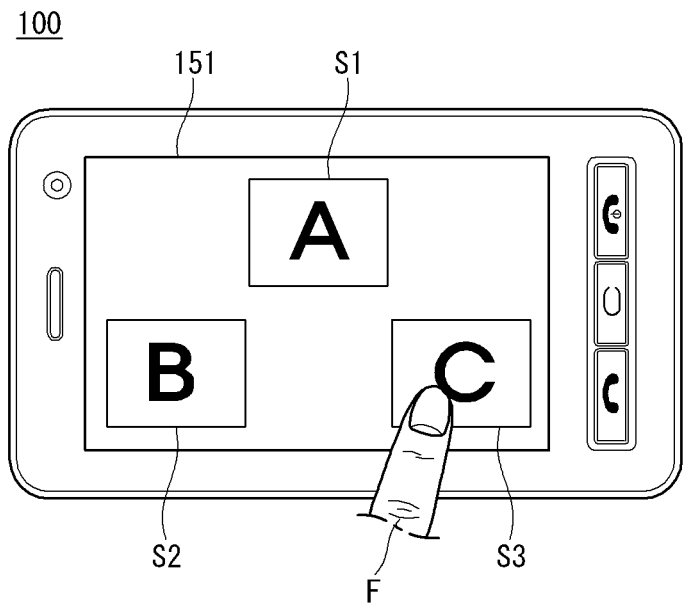
FIGS. 8 and 9 illustrate operating a mobile terminal to acquire contents information from an external electronic device to output the contents information according to an embodiment of the present invention.
Figure 9:
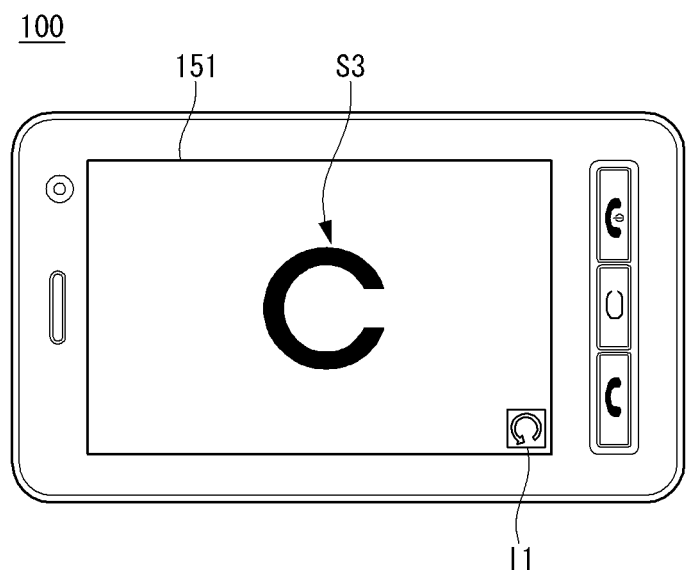

FIGS. 8 and 9 illustrate an operation of a mobile terminal 100 according to an embodiment of the present invention to acquire contents information from the external electronic devices and output the contents information.

Referring to FIGS. 1, 8 and 9, the controller 180 of the mobile terminal 100 may display first, second and third widgets S1, S2 and S3 acquired from the external electronic devices 100a, 100b and 100c on the display module 151. The user may select a desired one of the first, second and third widgets S1, S2 and S3 and display the selected widget on the overall screen of the display module 151.

The controller 180 may execute a managing mode of displaying acquired images in the form of thumbnails. The first, second and third widgets S1, S2 and S3 displayed in the form of thumbnails may represent positions of the external electronic devices 100a, 100b and 100c relative to the position of the mobile terminal 100. For example, the first widget S1 is acquired from the first external electronic device 100a located in front of the mobile terminal 100, the second widget S2 is acquired from the second external electronic device 100b located on the left of the mobile terminal 100 and the third widget S3 is acquired from the third external electronic device 100c located on the right of the mobile terminal 100. The controller 180 may display the first, second and third widgets S1, S2 and S3 based on these relative positions.

The user may select a desired one of the displayed first, second and third widgets S1, S2 and S3 by touching the desired one with a finger F as shown in FIG. 8. Referring to FIG. 9, the widget S3 selected by the user may be displayed on the overall screen area of the display module 151. Accordingly, the user can seamlessly view the third widget S3, which has been displayed on the third external electronic device 100c, through the mobile terminal 100. The display module 151 displaying the third widget S3 may also display a first icon I1. When the first icon I1 is selected, the controller 180 may start the managing mode.

Figure 10:
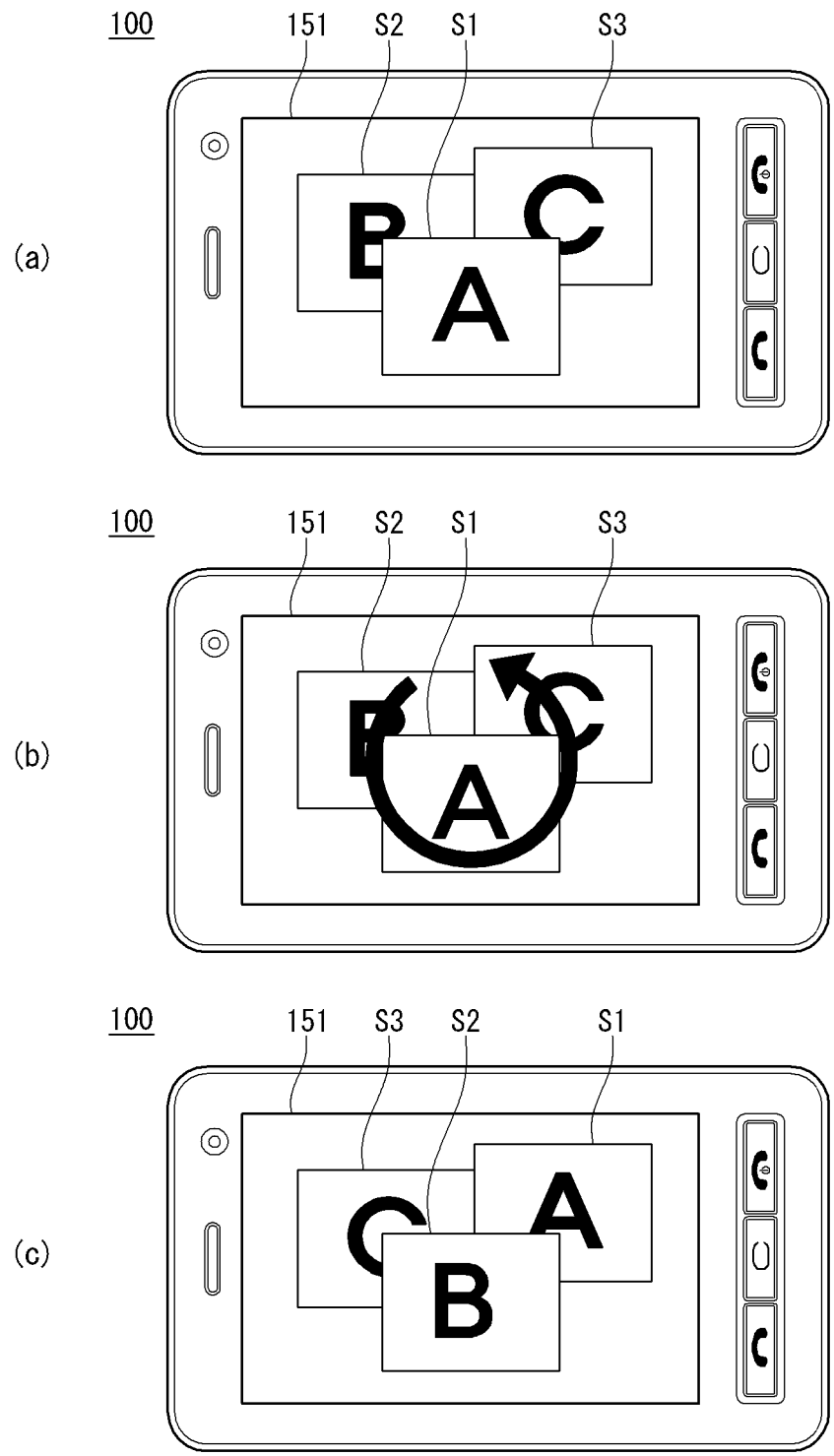
Figure 11:
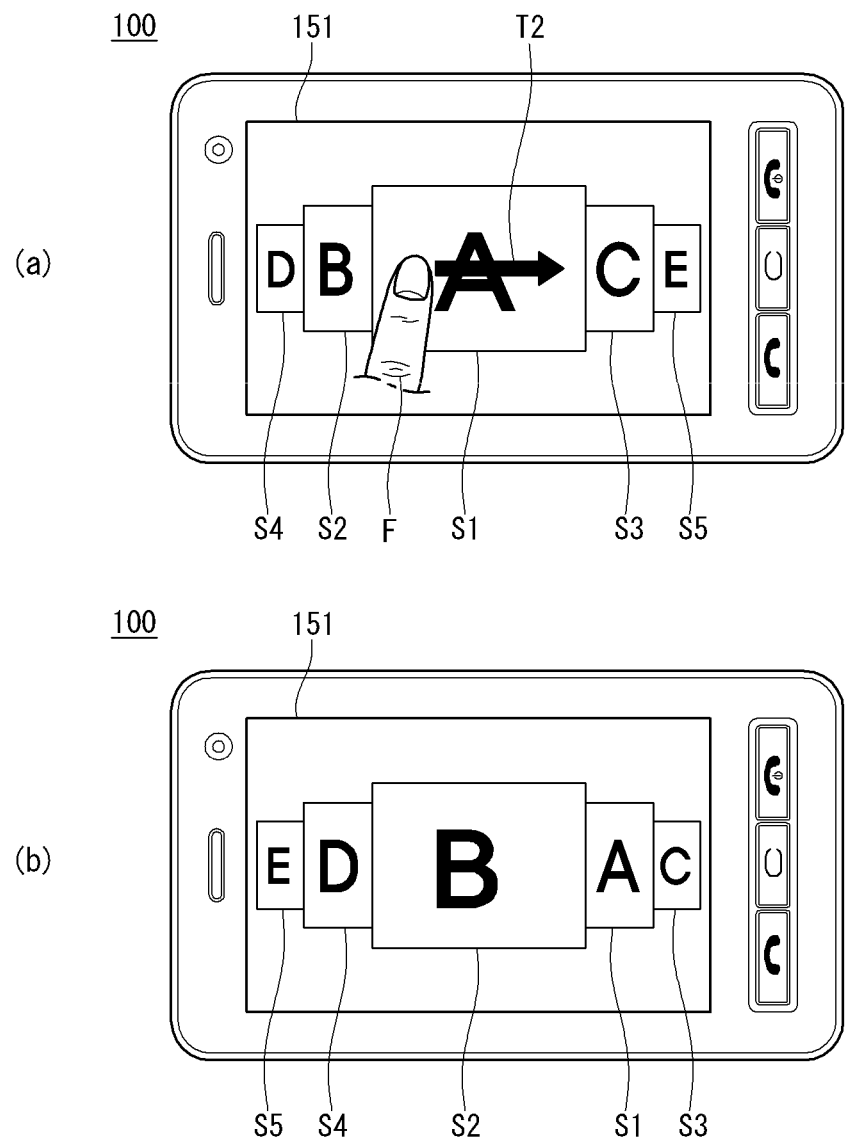
Figure 12:
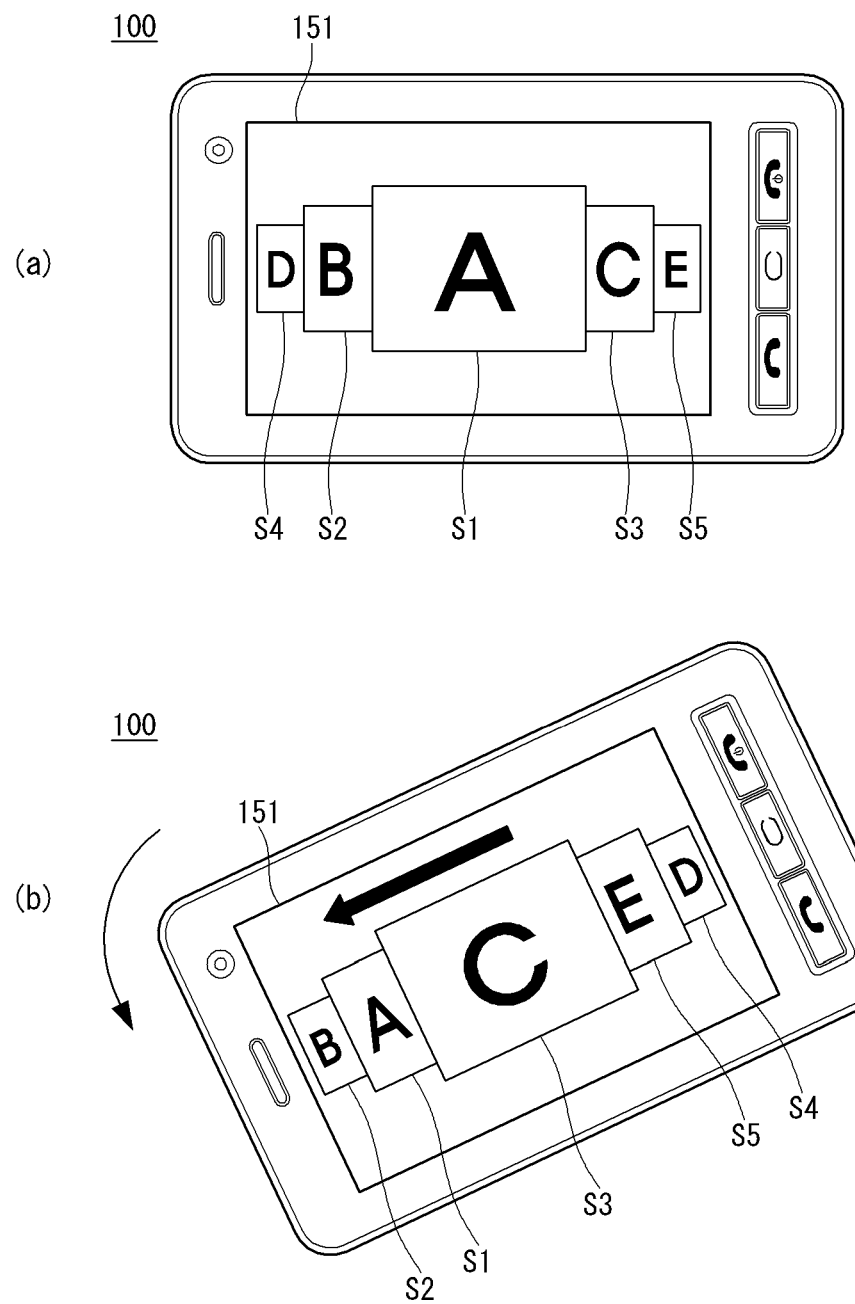

FIGS. 10, 11 and 12 illustrate operations of displaying contents information acquired by the mobile terminal 100 according to an embodiment of the present invention and manipulating the displayed contents information. The mobile terminal 100 can change displayed images through various operations.

Referring to FIG. 10(a), the display module 151 of the mobile terminal 100 may display the first, second and third widgets S1, S2 and S3 respectively acquired from the first, second and third external electronic devices 100a, 100b and 100c. The user may select one of the first, second and third widgets S1, S2 and S3, which will be displayed. For example, the user can locate a desired widget at the center of the display module 151. Accordingly, the first widget S1 can be displayed in the overall screen area of the display module 151 in the case of FIG. 10(a).

Referring to FIG. 10(b), the user may touch the display module 151 through a first touch operation T1. When the user performs a drag operation on the display module 151 through the first touch operation T1, the first, second and third widgets S1, S2 and S3 can rotate in the dragging direction.

Referring to FIG. 10(c), upon completion of the first touch operation T1 by the user, the layout of images displayed on the display module 151 may be changed. When the layout is changed such that the second widget S2 is displayed in front, as shown in FIG. 10(c), the second widget S2 can be displayed in the overall screen area of the display module 151.

Referring to FIG. 11(a), the display module 151 of the mobile terminal 100 may display first through fifth widgets S1 through S5 acquired from various electronic devices. The first widget S1 among the displayed widgets S1 through S5 may be displayed in the overall screen area of the display module 151. In this state, the user may want to display another image. Then, the user may touch the display screen of the display module 151 with his/her finger F through a second touch operation T2 in the horizontal direction. When the user's touch input is received, the controller 180 may rotate the first through fifth widgets S1 through S5 on a virtual axis.

Referring to FIG. 11(b), the widgets S1 through S5 displayed on the display module 151 sequentially rotate and a specific widget, the second widget S2, is displayed at the center of the display module 151. The second widget S2 displayed at the center of the display module 151 may be displayed in the overall screen area of the display module 151 in response to a control signal of the controller 180.

Referring to FIG. 12(a), the display module 151 of the mobile terminal 100 may display the first through fifth widgets S1 through S5 acquired from the various electronic devices. Referring to FIGS. 1 and 12(b), when the user tilts the mobile terminal 100 to the left or right, the sensing unit 140 of the mobile terminal 100, which may include an acceleration sensor, can sense the posture of the mobile terminal 100. Accordingly, the controller 180 can move the displayed first through fifth widgets S1 through S5 to the left or right according to the direction sensed by the acceleration sensor. The user can control the moving speed of the first through fifth widgets S1 through S5 by adjusting the tilt of the mobile terminal 100.

Figure 13:
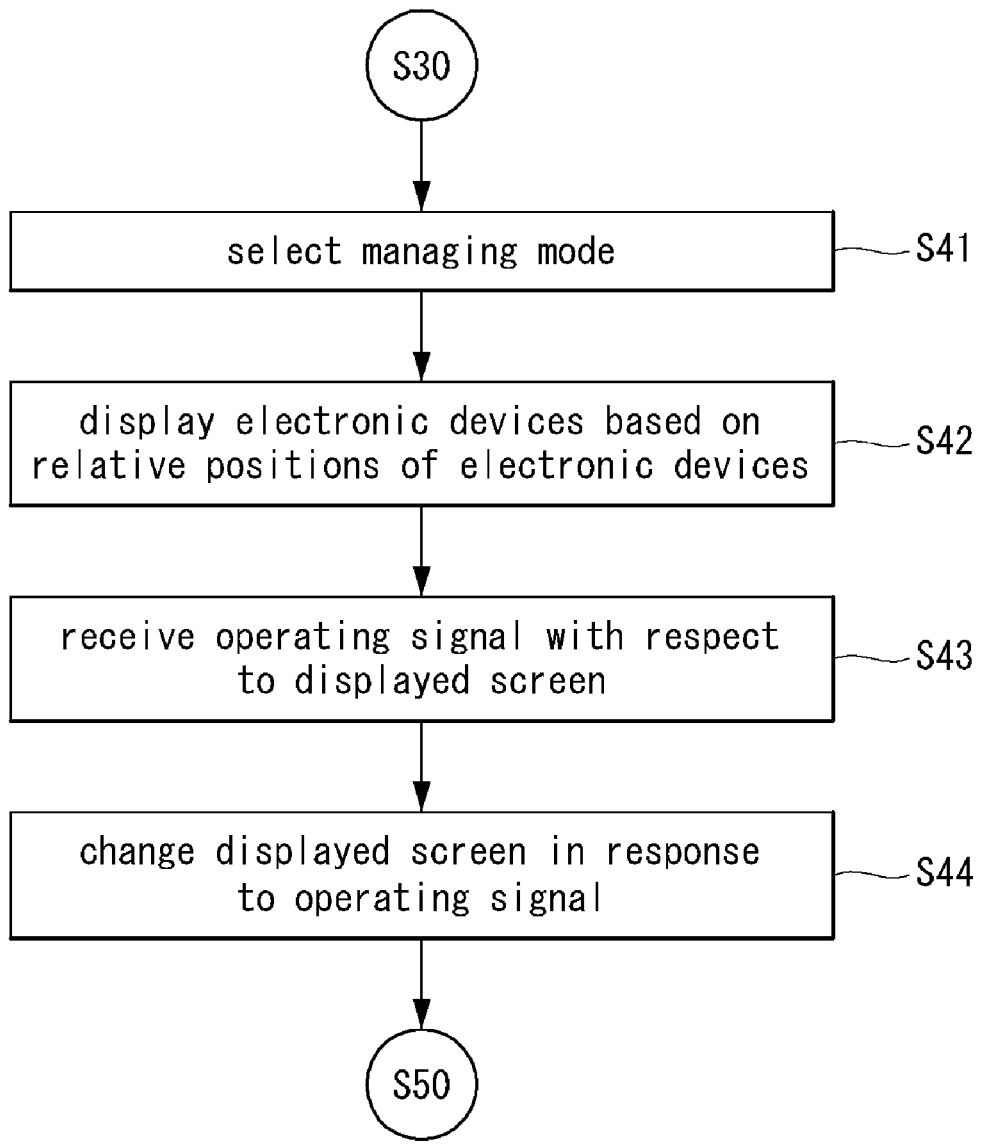
FIG. 13 is a flowchart illustrating an operation of receiving an operating signal with respect to output contents information according to an embodiment of the present invention.
Figure 14:
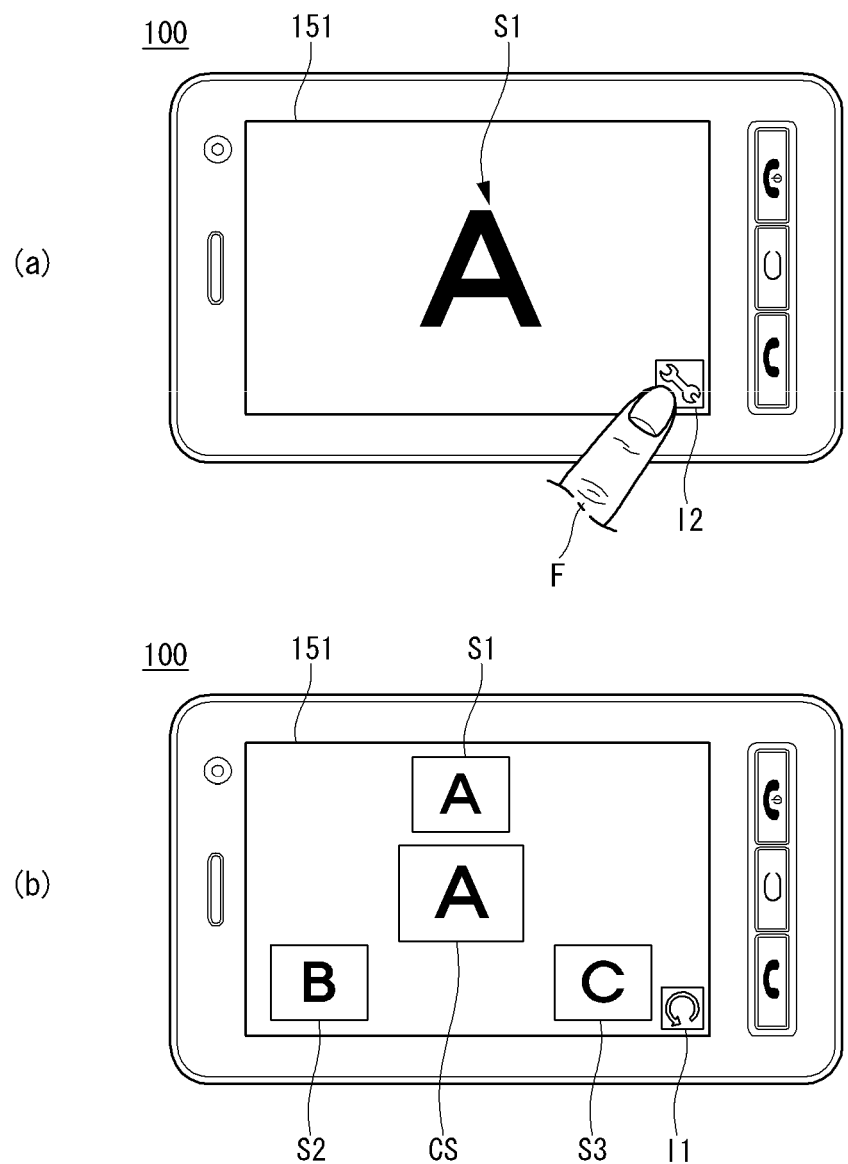
Figure 15:
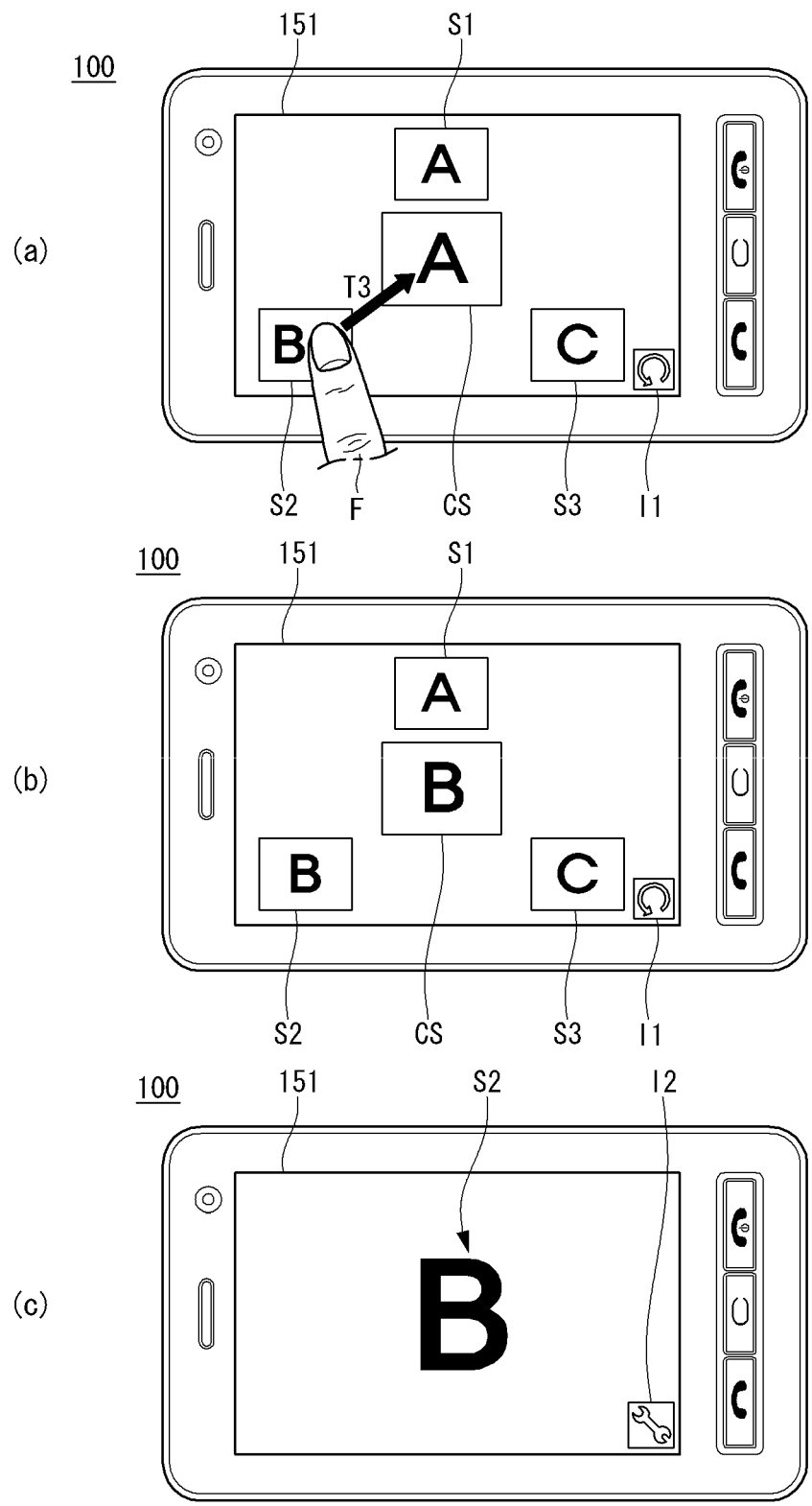
Figure 16:
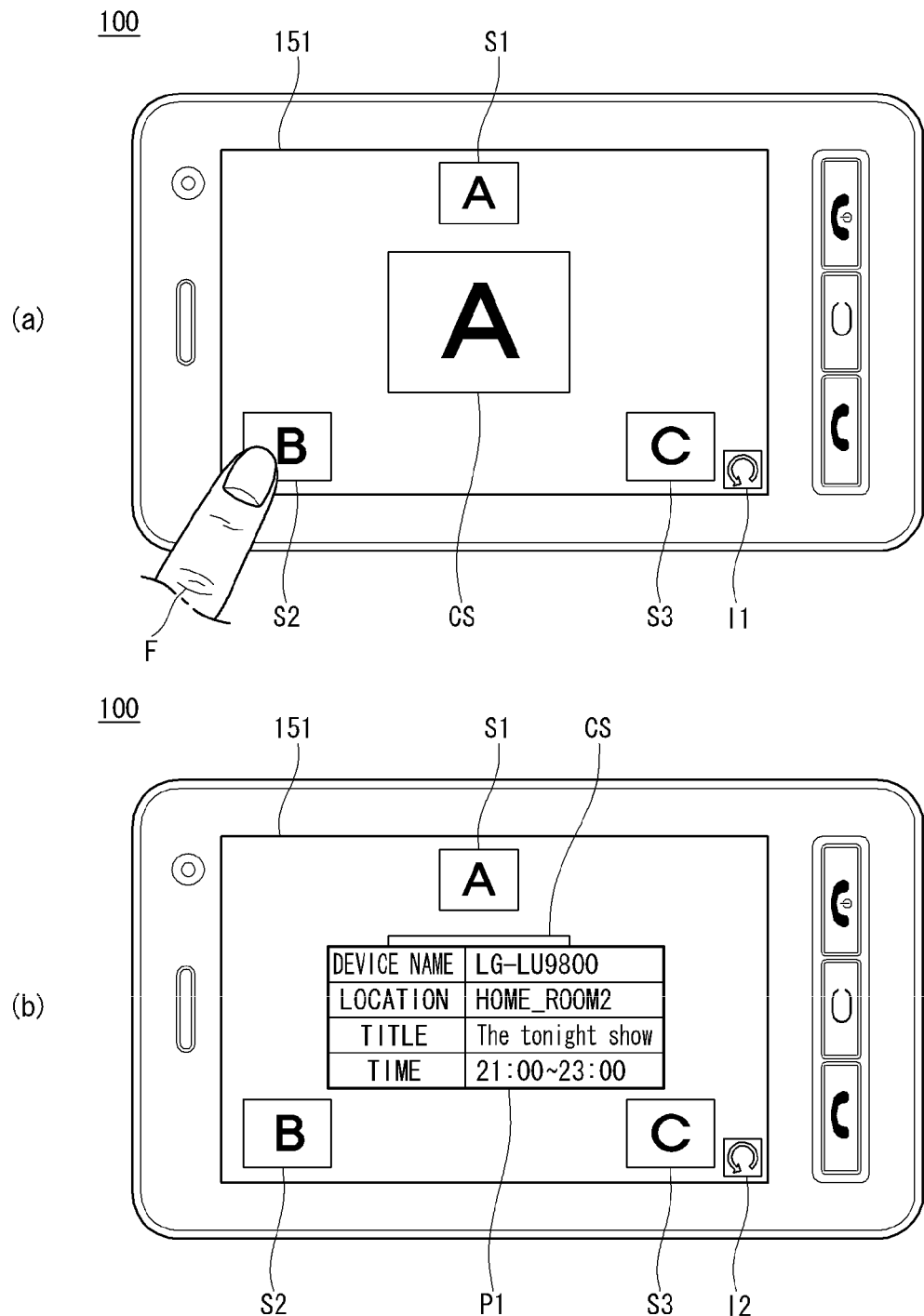

FIG. 13 is a flowchart illustrating, in detail, the operation S40 of receiving an operating signal with respect to output contents information described in FIG. 5.

Referring to FIGS. 1, 6 and 13, the operation S40 of receiving an operating signal with respect to contents information output from the mobile terminal 100 may include selecting the managing mode (S41). The managing mode displays searched external electronic devices such that the user can operate the displayed external electronic devices. When the managing mode is selected, the searched external electronic devices may be displayed in the form of thumbnails. Further, the display form of the searched external electronic devices can be changed, new external electronic devices can be searched, or searched external electronic devices can be deleted in the managing mode, which will be explained in more detail later.

When the managing mode is selected, the external electronic devices can be displayed based on the relative positions thereof. The relative positions may be positions of the first, second and third external electronic devices 100a, 100b and 100c relative to the position of the mobile terminal 100. For example, the positions of the first, second and third external electronic devices 100a, 100b and 100c are relative to the mobile terminal 100 that is positioned at the center on the display module 151.

An operating signal with respect to the displayed screen may be received (S43) and the displayed screen may be changed in response to the received operating signal (S44). The operating signal with respect to the displayed screen may be a signal generated by a user's touch on images displayed on the display module 151. When the operating signal is generated, the controller 180 may change the display form of the display module 151 in response to the operating signal. For example, the controller 180 can change the layout of displayed images or change images shared by the mobile terminal 100 and the external electronic devices 100a, 100b and 100c.

FIGS. 14 through 19 illustrate operations of outputting contents information received from external electronic devices and controlling the external electronic devices based on the contents information. In the managing mode, the user can operate received contents information in various manners to control data communication with the external electronic devices 100a, 100b and 100c.

Referring to FIG. 14(a), the display module 151 of the mobile terminal 100 may display the first widget S1 received from the first external electronic device 100a. The user may select a second icon I2 displayed at a certain portion of the display module 151. The second icon I2 may be a menu for entering the managing mode.

Referring to FIG. 14(b), when the mobile terminal 100 enters the managing mode, the first, second and third widgets S1, S2 and S3 respectively received from the first, second and third external electronic devices 100a, 100b and 100c may be displayed on the display module 151. Furthermore, a selected screen CS may be displayed at the center of the display module 151.

The selected screen CS may be an image to be displayed in the overall screen area of the display module 151 when the managing mode is ended. That is, an image selected from images of the external electronic devices to be shared by the user may be displayed. The selected screen CS may display images received from the external electronic devices 100a, 100b and 100c continuously or display images received from the external electronic devices 100a, 100b and 100c at specific intervals. That is, the selected screen CS may display a video or a still image. In FIG. 14(b), the first widget S1 received from the first external electronic device 100a is displayed as the selected screen CS.

Referring to FIG. 15(a), the user may change the display of the selected screen CS. The display of the selected screen CS may be changed through a third touch operation T3 starting from one of the first, second and third widgets S1, S2 and S3, for example S2, toward the selected screen CS.

Referring to FIG. 15(b), the second widget S2 instead of the first widget S1 is selected as the selected screen CS according to the third touch operation T3. When an external electronic device which will share the selected screen CS with the mobile terminal 100 is selected, the user may select the first icon I1 for displaying the selected screen CS in the overall screen area of the display module 151.

Referring to FIG. 15(c), the second widget S2 selected as the selected screen CS may be displayed on the display module 151. Further, the second icon I2 for entering the managing mode may be displayed on a portion of the display module 151.

Referring to FIG. 16(a), the user may select the second widget S2 among displayed images with his/her finger F. Referring to FIG. 16(b), detailed information about contents information corresponding to the second widget S2 selected by the user may be displayed in a first pop-up window P1. As described above, the contents information may be the contents, description of the contents and information about the source of the contents. The first pop-up window P1 may display the description of the contents. Furthermore, the information about the contents source may be displayed if required.

Figure 17:
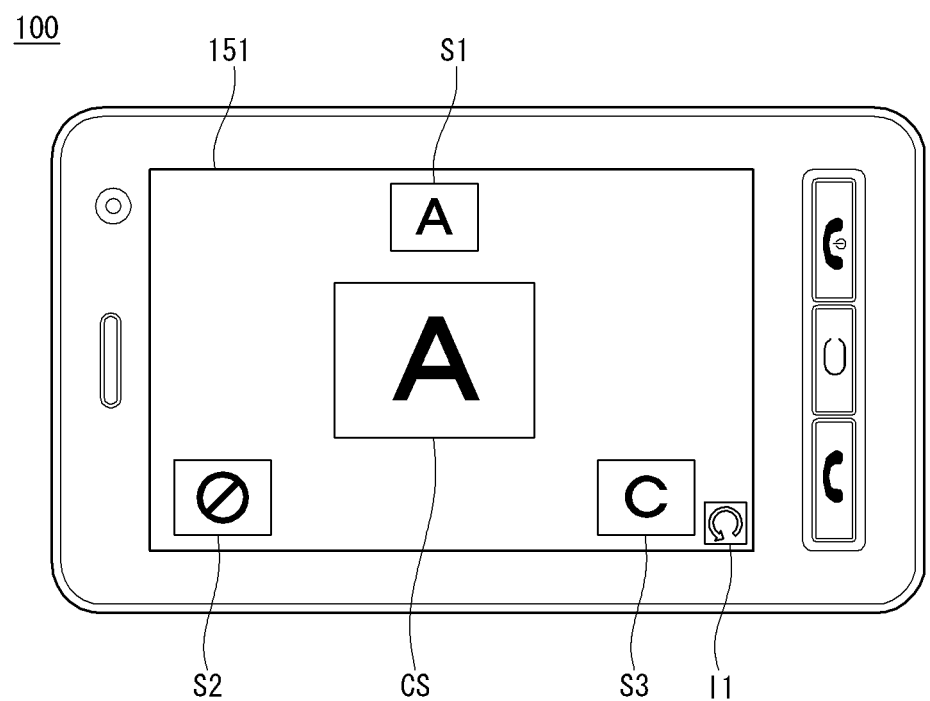

Referring to FIGS. 1, 6 and 17, specific contents information may be blocked from being shared. For example, the second external electronic device 100b corresponding to the second widget S2 does not allow the contents information corresponding to the second widget S2 to be shared with the mobile terminal 100. When contents information is blocked from being shared with the mobile terminal 100 although an external electronic device corresponding to the contents information is searched and displayed on the display module 151 of the mobile terminal, the controller 180 may inform the user of the fact through a specific icon S2.

Referring to FIG. 18(a), the display module 151 may display a rotation icon I3. The rotation icon I3 may be an object rotating clockwise or counter clockwise in response to a fourth touch operation T4. The rotation icon I3 may have a direction indicator D to indicate the direction currently pointing by the rotation icon I3. In FIG. 18(a), the rotation icon I3 points toward the first widget S1 as indicated by the direction of the direction indicator D. Accordingly, the first widget S1 can be displayed on the overall screen of the display 151 when the user selects the first icon I1.

Referring to FIG. 18(b), the user may rotate the rotation icon I3 to change the image to be displayed on the overall screen of the display module 151. For example, when the rotation icon I3 is rotated, the direction indicator D points toward the second widget S2.

Referring to FIG. 19(a), contrary to the embodiment shown in FIGS. 18(a) and 18(b), the rotation icon I3 may be fixed. Thus, the first, second and third widgets S1, S2 and S3 arranged around the rotation icon I3 may be rotated clockwise or counterclockwise in the direction of a fifth touch operation T5.

Referring to FIG. 19(b), the user may rotate the first, second and third widgets S1, S2 and S3 in the direction of the fifth touch operation T5 to display the second widget S2 instead of the first widget S1 on the overall screen of the display module 151.

Figure 20:
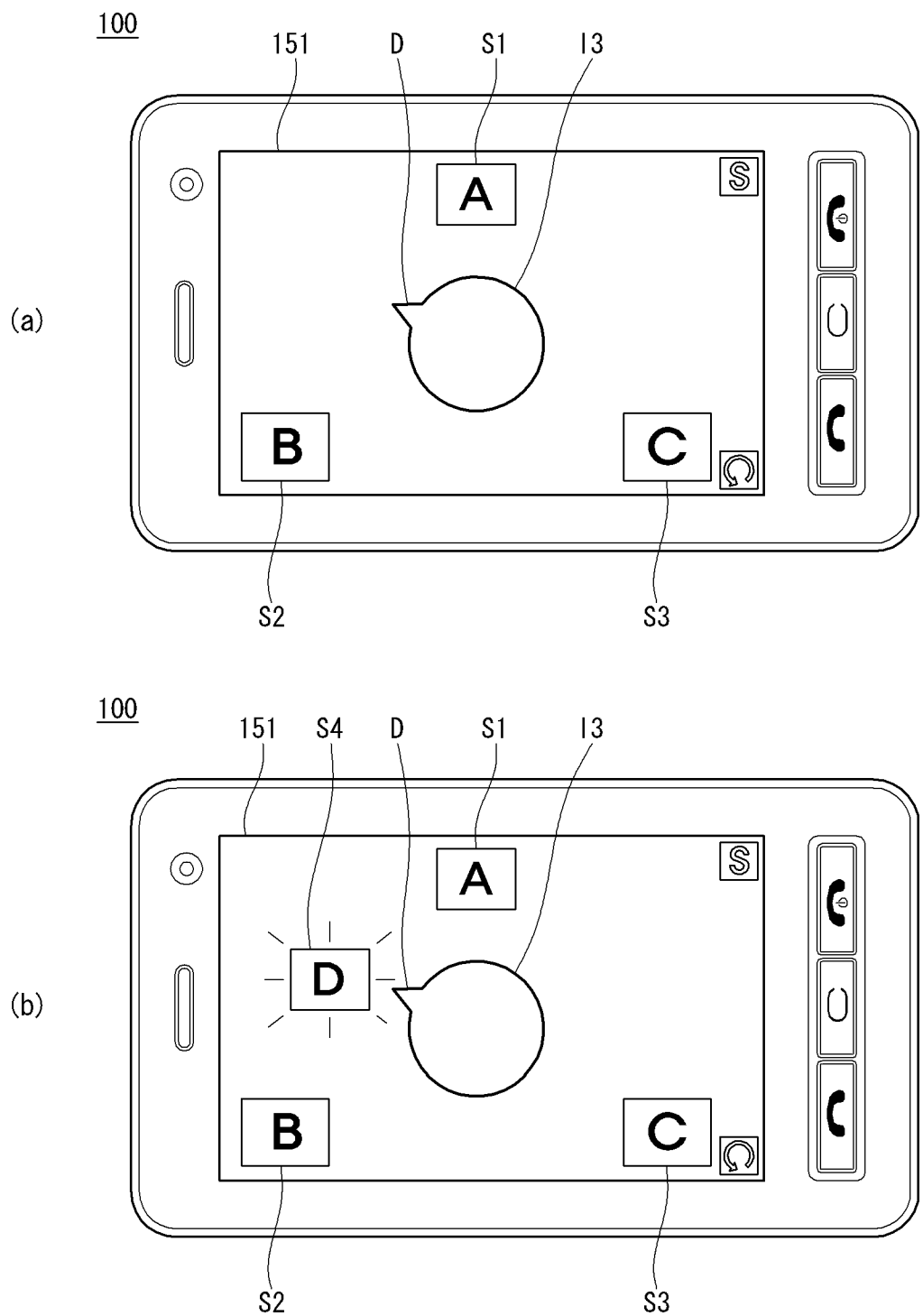
FIG. 20 illustrates an operation of a mobile terminal to search for a new external device according to an embodiment of the present invention.

FIG. 20 illustrates an operation of a mobile terminal 100 according to an embodiment of the present invention to search for a new external device. In this embodiment, the mobile terminal 100 can provide a user interface by which the user can manually search for an external electronic device.

Referring to FIG. 20(a), the user may rotate the rotation icon I3 such that the direction indicator D points toward a direction in which no image is currently displayed. When the rotation icon I3 is rotated to the direction in which no image is currently displayed, the controller 180 may search for a new external electronic device which is present in the pointed direction.

Referring to FIG. 20(b), if a new external electronic device exists in the direction pointed by the rotated rotation icon I3, the mobile terminal 100 can communicate with the new external electronic device to receive contents information from the new external electronic device. Upon reception of the contents information, the controller 180 may display a fourth image S4 corresponding to the newly received external electronic device on the corresponding position of the display module 151.

Figure 21:
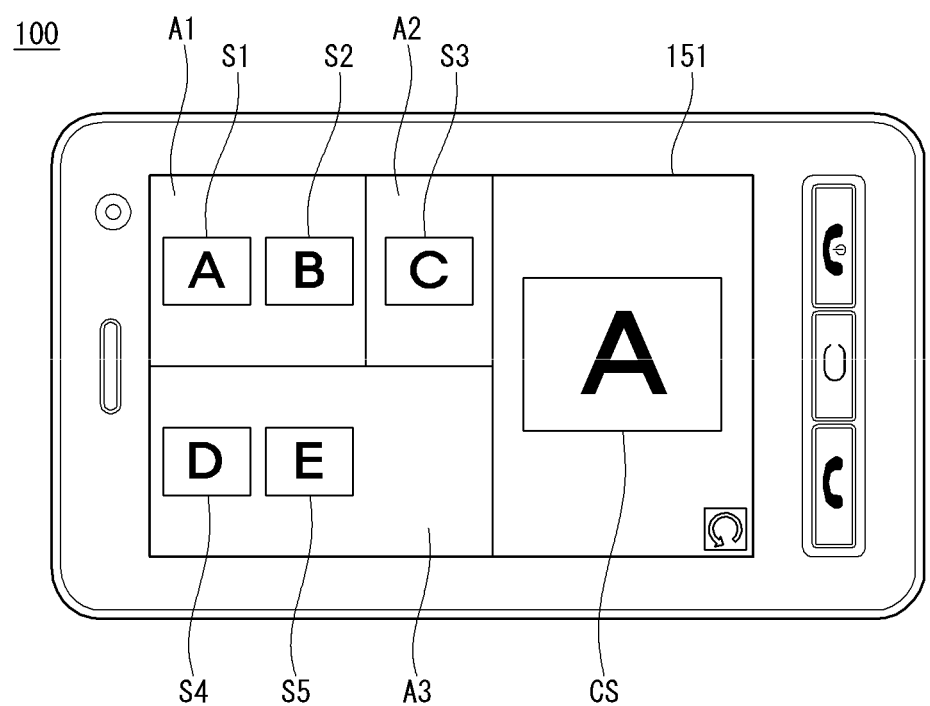
FIG. 21 illustrates a layout of external electronic devices searched by a mobile terminal according to an embodiment of the present invention.

FIG. 21 illustrates a layout of external electronic devices searched by a mobile terminal according to an embodiment of the present invention. The mobile terminal 100 can display images received from the searched external electronic devices in respective spaces.

Referring to FIG. 21, the mobile terminal 100 may receive contents information corresponding to the first through fifth widgets S1 through S5. Here, the external electronic devices corresponding to the first and second widgets S1 and S2, the external electronic device corresponding to the third widget S3 and the external electronic devices corresponding to the fourth and fifth widgets S4 and S5 may be respectively located in different spaces or areas. For example, the external electronic devices corresponding to the first and second widgets S1 and S2 may be located in a large room on the second floor, the external electronic device corresponding to the third widget S3 may be located in a small room on the second floor, and the external electronic devices corresponding to the fourth and fifth widgets S4 and S5 may be placed in a living room on the first floor.

The controller 180 may divide display screen of the display module 151 into first, second and third areas A1, A2 and A3 to visually represent the external electronic devices arranged in different spaces. The selected screen CS displaying contents selected to be shared with the mobile terminal 100 may be displayed on a designated portion of the display module 151.

Figure 22:
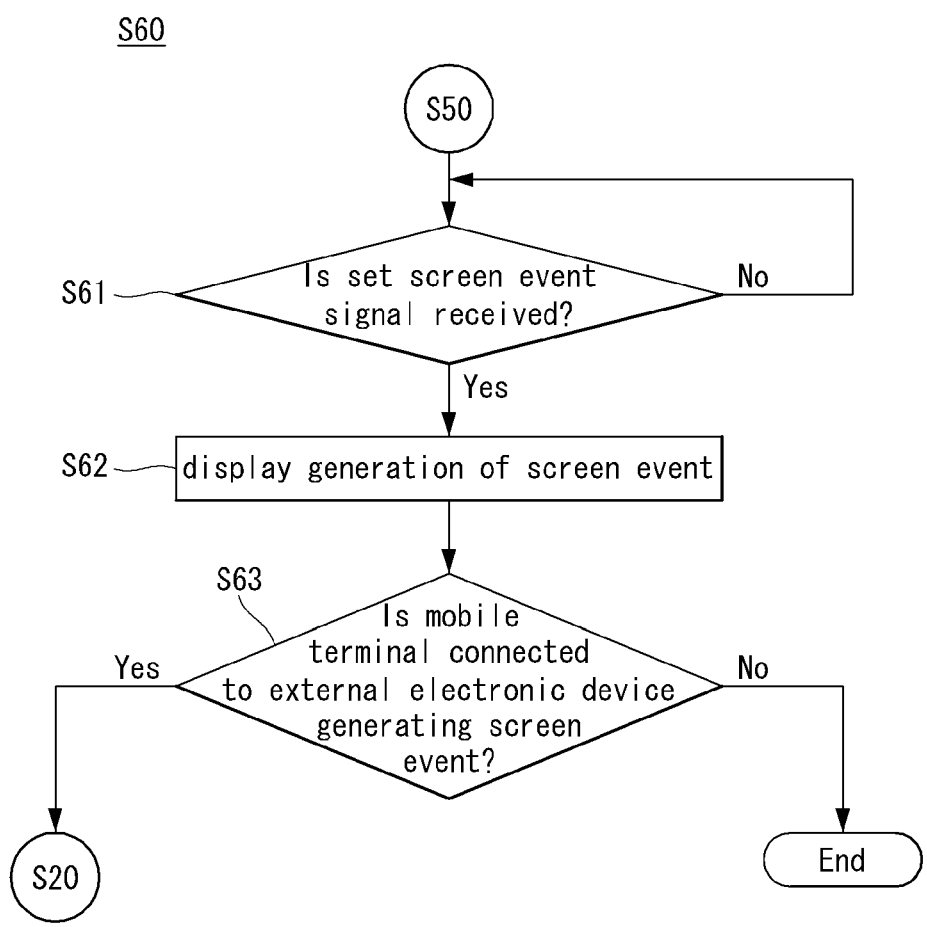
FIG. 22 is a flowchart illustrating an operation of a mobile terminal which relates to a screen event according to an embodiment of the present invention.
Figure 23:
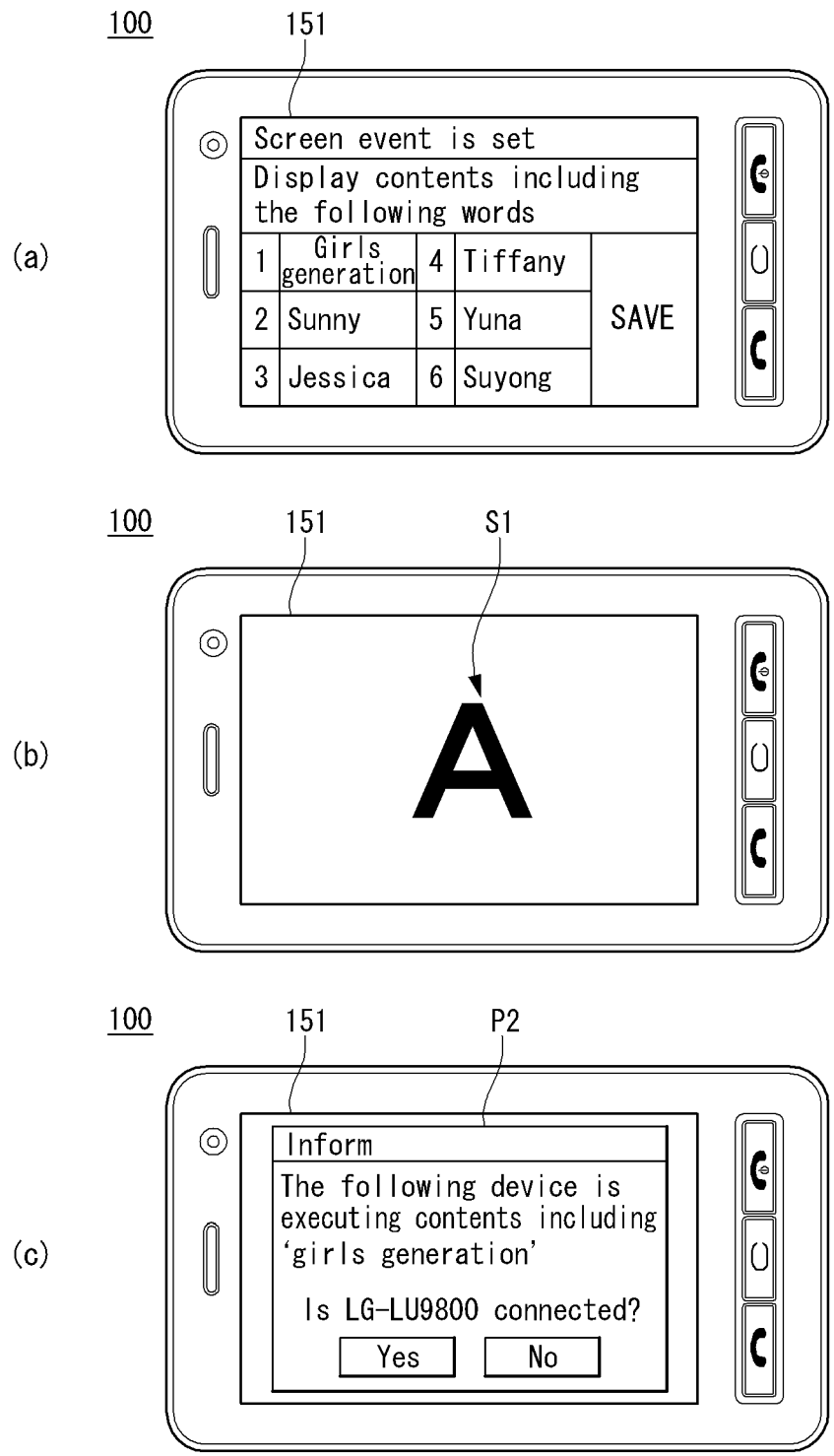
FIG. 23 illustrates an operation relating to the screen event shown in FIG. 22.

FIG. 22 is a flowchart illustrating an operation relating to a screen event in a mobile terminal according to an embodiment of the present invention and FIG. 23 illustrates the operation relating to the screen event shown in FIG. 22.

Referring to FIGS. 22 and 23, the mobile terminal 100 may inform the user when a set screen event is received. The screen event may be a function of displaying information in which the user is interested in. Specifically, when contents, which satisfy a condition set by the user among the contents output from external electronic devices, are output, the screen event displays the contents of interest on the mobile terminal 100.

To execute the screen event function, the controller 180 determines whether a set screen event signal is received (S61), displays the generation of the screen event (S62) and determines whether mobile terminal 100 is connected to an external electronic device generating the screen event (S63).

The set screen event signal may be generated only when a specific condition previously set by the user is satisfied. For example, if the user is interested in tropical fish, the user can set 'cardinal tetra' as a keyword. The controller 180 filters contents information received from external electronic devices connected to the mobile terminal 100 to determine whether contents information including the keyword is present. If there is contents information including the keyword, the controller 180 informs the user by displaying the information, indicating that there is contents information including the keyword, on the display module 151 of the mobile terminal 100.

Referring to FIG. 23(a), the user of the mobile terminal 100 sets a screen event by inputting specific keywords in which the user is interested in and saving the keywords. Thereafter, while the display module 151 of the mobile terminal 100 displays the first widget S1, as shown in FIG. 23(b), if the set screen event is generated, a second pop-up window P2 may be displayed, as shown in FIG. 23(c). The second pop-up window P2 may display the detailed information about the screen event and the name of the external electronic device generating the screen event. The second pop-up window P2 may additionally display a message that inquires whether to connect to the external electronic device.

Figure 24:
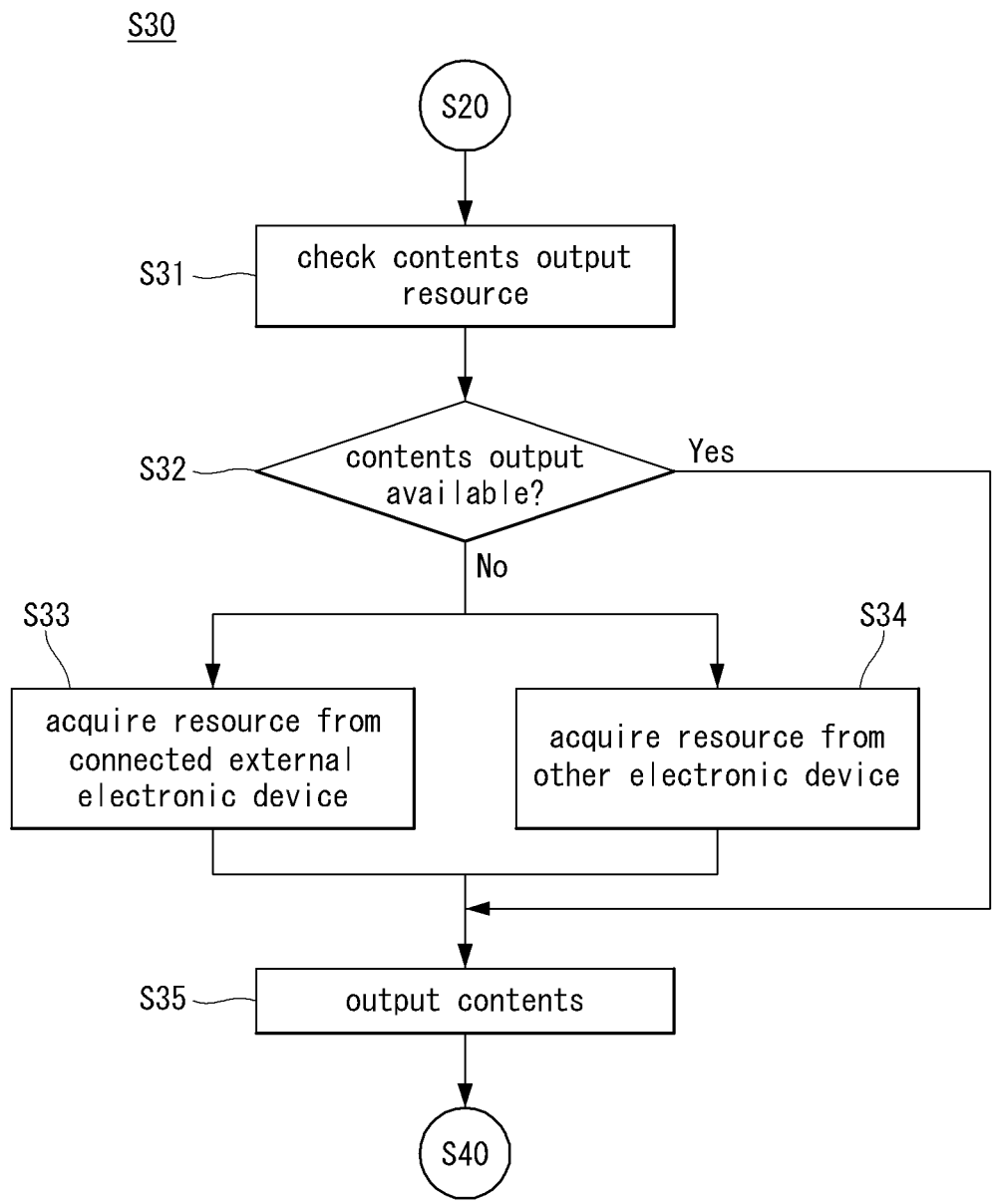
FIGS. 24 and 25 are flowcharts illustrating an operation of a mobile terminal to share a contents output resource according to an embodiment of the present invention.
Figure 25:
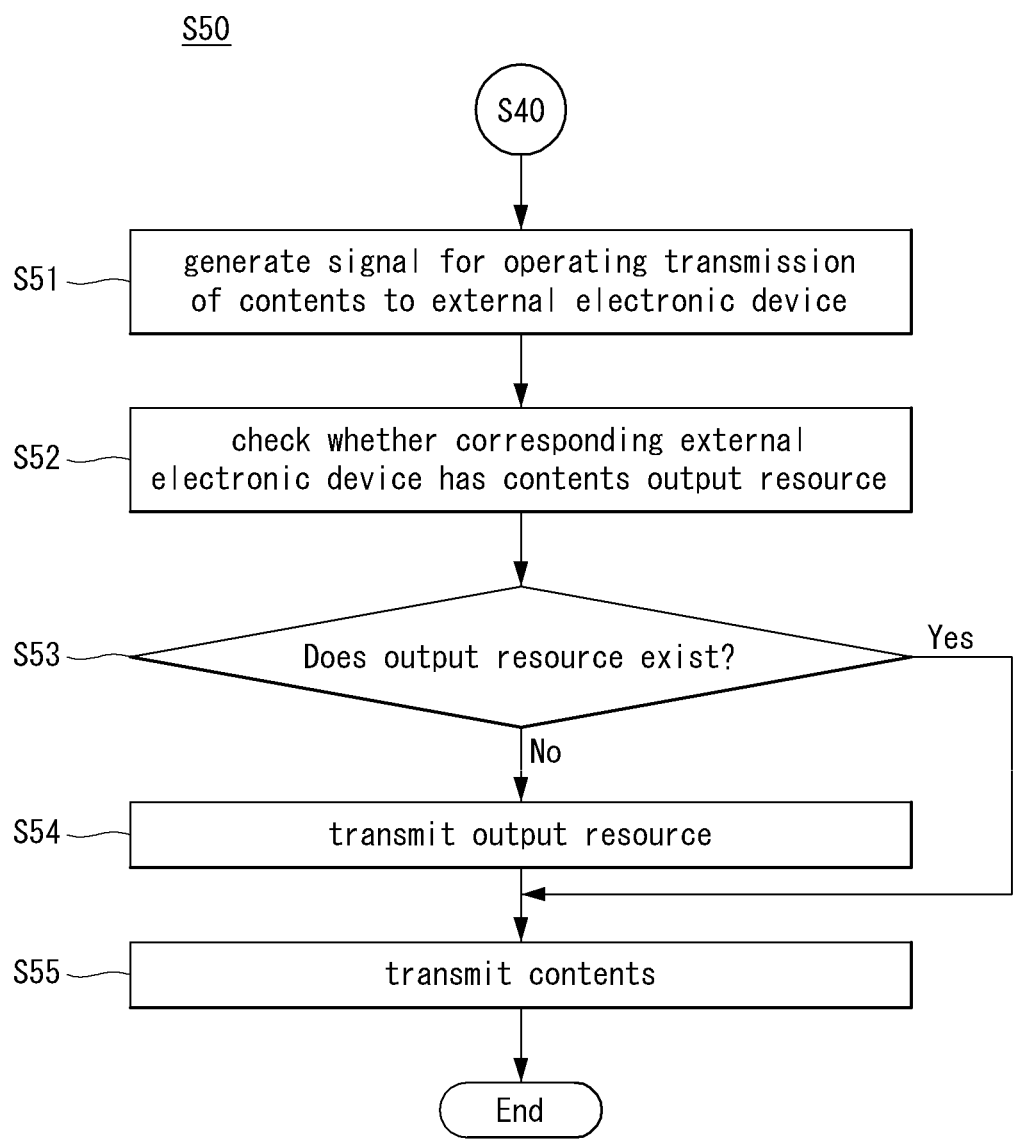

FIGS. 24 and 25 are flowcharts illustrating an operation of a mobile terminal according to an embodiment of the present invention to share a contents output resource.

Referring to FIGS. 1, 24 and 25, the mobile terminal 100 can share the contents output resource. The contents output resource may be an application, codec or the like which can output specific contents. Even when contents are shared by electronic devices, the shared contents cannot be output properly if there is no resource capable of outputting the shared contents. Furthermore, although the contents may be output properly from a specific electronic device, the same contents may not be output properly from another electronic device because the resolution of the contents may be different from that of the other electronic device. The mobile terminal 100 can prevent these problems by sharing the contents output resource.

To achieve this, operation S30 in FIG. 5, i.e., outputting acquired contents information through the mobile terminal 100, may include checking the contents output resource (S31). The operation S31 of checking the contents output resource may be performed on the mobile terminal 100 connected to other external electronic devices. Specifically, the operation S31 may be performed when the mobile terminal 100 receives contents information from the external electronic devices.

The controller 180 may determine whether the contents information can be output properly (S32) and acquire the contents output resource from an external electronic device connected to the mobile terminal 100 if the contents information cannot be output properly (S33) or obtain the contents output resource from another external electronic device (S34).

It is probable that an external electronic device that transmits contents to the mobile terminal 100 may possess the contents output resource capable of playing the contents. Accordingly, if the mobile terminal 100 does not have contents output resource, the mobile terminal 100 may receive the contents output resource from the external electronic device. If the external electronic device does not have the contents output resource, the mobile terminal 100 may acquire the contents output resource from other external electronic devices. Here, the other external electronic device may be one of electronic devices that are currently connected to the mobile terminal 100 and a server linked to a network. Finally, when the contents output resource is secured, the acquired contents may be output (S35).

Referring to FIGS. 1 and 25, the contents output resource may be transmitted from the mobile terminal 100 to an external electronic device. To execute this function, operation S50 in FIG. 5, i.e., controlling the external electronic devices based on the received operating signal, may include generating a signal for operating transmission of contents to an external electronic device (S51). The signal for operating transmission of contents to the external electronic device may be an input signal generated in response to user input or a control signal of the controller 180 for transmitting specific contents from the mobile terminal 100 to the external electronic device.

Upon generation of the signal for operating transmission of contents to the external electronic device, the controller 180 may check whether the external electronic device has the contents output resource (S52). That is, the mobile terminal 100 which will transmit the contents can check whether the external electronic device has the contents output resource capable of outputting the contents.

When it is determined that the external electronic device has no contents output resource (S53), the controller 180 may transmit the contents output resource (S54), and then transmit the contents (S55).

The external electronic device which received the contents may receive user input with regard to processing of the contents received along with an alert of occurrence of a screen event. For example, the external electronic device may display a pop up window to receive an input for selecting an operation such as displaying, storing, reproducing, deleting, or rejecting the contents.

From the pop up window displaying operations available for the contents, the user may select a desired operation. Once the user input is received, an operation corresponding to the user input is performed. Furthermore, the external device which received the contents may generate and display an icon or widget corresponding to the received contents so that operations related to the contents can be performed easily in the future.

The mobile terminal 100 which will transmit the contents may have the contents output resource for outputting the contents. Accordingly, the mobile terminal 100 may also transmit the contents output resource to the external electronic device. When the transmission of the contents output resource to the external electronic device is finished and the external electronic device is ready to output the contents, the contents can be transmitted to the external electronic device.

Although the external electronic devices have been described as being fixed to specific positions around the mobile terminal in the aforementioned embodiments, the positions of the external electronic devices can be changed according to the variable position of the mobile terminal. For example, electronic devices capable of communicating with the mobile terminal moving with the user when the user goes to work from home by transportation means may correspond to the external electronic devices.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display comprising a touch screen;
a hardware communication unit configured to receive, from other electronic devices, information related to video content being reproduced at each of the other electronic devices, wherein the information includes a reproduction time point corresponding to a position in the video content that is being reproduced by a corresponding one of the other electronic devices at a time when the information is transmitted to the mobile terminal; and
a controller configured to control the display to:
display a plurality of widgets respectively corresponding to the other electronic devices, each of the plurality of widgets comprising an image of the video content that is displayed at the corresponding one of the other electronic devices, wherein the plurality of widgets are arranged and displayed based on actual relative positions of the other electronic devices with respect to an actual position of the mobile terminal; and
display the video content on an entire screen area of the display from the reproduction time point based on the information received from the corresponding one of the other electronic devices in response to a touch input for selecting the corresponding one of the other electronic devices, the touch input received via a corresponding one of the plurality of widgets displayed on the display;

wherein:
the actual position of the mobile terminal corresponds to a center of the screen area; and
the corresponding one of the plurality of widgets is displayed distinctively over the rest of the plurality of widgets in response to the touch input and the distinctively displayed one of the plurality of widgets is eventually displayed by itself on the entire screen area of the display after being displayed distinctively among the plurality of widgets for a preset period of time.

2. The mobile terminal of claim 1, wherein in response to a second touch input, including touching on the touch screen at a location relative to a first one of the plurality of widgets and dragging from the touched first one of the plurality of widgets to a second one of the plurality of widgets, information related to contents being executed at a first one of the other electronic devices corresponding to the first one of the plurality of widgets is transmitted to a second one of the other electronic devices corresponding to the second one of the widgets.

3. The mobile terminal of claim 1, wherein the hardware communication unit communicates with at least one of the other electronic devices wirelessly, and the controller is further configured to control the display to display a menu when a first one of the plurality of widgets is selected, and the menu comprises a menu item for sending a message from the mobile terminal to a first one of the other electronic devices corresponding to the selected first one of the plurality of widgets via the hardware communication unit.

4. The mobile terminal of claim 1, wherein:
the controller is further configured to control the display to arrange and display the plurality of widgets based on actual relative positions of the electronic devices with respect to an actual position of the mobile terminal; and
the actual position of the mobile terminal corresponds to a center of the screen area.

5. The mobile terminal of claim 1, wherein:
the controller is further configured to control the display to display the corresponding one of the plurality of widgets distinctively over the rest of the plurality of widgets; and
after a preset period of time, the distinctively displayed one of the plurality of widgets is eventually displayed on the entire screen area of the display.

6. The mobile terminal of claim 1, wherein the controller is further configured to control the display to arrange and display the plurality of widgets based on priority of the received information, and wherein criteria for determining the priority is preset by a user or by default.

7. The mobile terminal of claim 1, wherein the controller is further configured to control the display to display a rotatable icon along with the plurality of widgets such that an operating signal for selecting a specific one of the plurality of widgets is generated in response to rotation of the icon displayed on the display.

8. The mobile terminal of claim 1, further comprising a memory configured to store a specific keyword that is used to identify contents information related to the specific keyword, wherein the controller is further configured to output alert information upon detecting contents information related to the specific keyword from at least one of the other electronic devices.

9. The mobile terminal of claim 1, wherein the controller is further configured to request an electronic device to provide a resource required to display the video content properly on the display, and the display is further configured to display the video content after receiving the resource from the electronic device.

10. The mobile terminal of claim 1, wherein the information further includes supplemental information about the video content and information about a source of the video content, the supplemental information comprising at least a description, a title or running time of the video content, or a name or type of an electronic device providing the video content.

11. The mobile terminal of claim 1, wherein the widgets are categorized into at least two groups, at least one widget in each group being grouped together based on a location at which at least one electronic device corresponding to the at least one widget is located, and wherein each group is identified by an assigned name of the location.

12. The mobile terminal of claim 1, wherein the controller is further configured to control the display to display the information related to the video content displayed at the corresponding one of the other electronic devices on a first defined portion of the screen area while the plurality of widgets are displayed on a second defined portion of the screen area.

13. The mobile terminal of claim 12, wherein the information is displayed as a still image on the first defined portion of the screen area, and wherein the still image is updated periodically according to progress of the content displayed at the corresponding one of the other electronic devices.

14. The mobile terminal of claim 1, wherein the video content provided to the corresponding one of the other electronic devices is stored in an external storage that is not included in the mobile terminal and the other electronic devices.

15. The mobile terminal of claim 1, wherein:
the image of the video content included in the widget is identical to the video content displayed at the corresponding one of the other electronic devices except for its size; and
the image of the video content is displayed on the display in synchronization with the video content displayed at the corresponding one of the other electronic devices.

16. A method of controlling a mobile terminal, the method comprising:
communicating with other electronic devices;
receiving information related to video content being reproduced at each of the other electronic devices from each of the other electronic devices, wherein the information includes a reproduction time point corresponding to a position in the video content that is being reproduced by a corresponding one of the other electronic devices at a time when the information is transmitted to the mobile terminal;
displaying, on a display of the mobile terminal, a plurality of widgets respectively corresponding to the other electronic devices, each of the plurality of widgets comprising an image of the video content that is being displayed at the corresponding one of the other electronic devices, wherein the plurality of widgets are arranged and displayed based on actual relative positions of the other electronic devices with respect to an actual position of the mobile terminal; and
displaying the video content on an entire screen area of the display from the reproduction time point based on the information received from the corresponding one of the other electronic devices in response to a touch input for selecting the corresponding one of the other electronic devices, the touch input received via a corresponding one of the plurality of widgets displayed on the display;

wherein:

the actual position of the mobile terminal corresponds to a center of the screen area; and the corresponding one of the plurality of widgets is displayed distinctively over the rest of the plurality of widgets in response to the touch input received and the distinctively displayed one of the plurality of widgets is eventually displayed by itself on the entire screen area of the display after being displayed distinctively among the plurality of widgets for a preset period of time.

17. The method of claim 16, further comprising:

receiving a specific keyword to identify contents information related to the specific keyword; and outputting alert information upon detecting the contents information related to the specific keyword from at least one of the other electronic devices.

18. The method of claim 16, wherein the mobile terminal communicates with at least one of the other electronic devices wirelessly, the method further comprising requesting an electronic device to provide a resource required to display the video content properly before displaying the video content on the display.

* * * * *